US 9,887,928 B2

(12) United States Patent
Wang et al.

(10) Patent No.: US 9,887,928 B2
(45) Date of Patent: Feb. 6, 2018

(54) SYSTEM AND METHOD FOR IDENTIFYING PERFORMANCE CHARACTERISTICS IN ASYNCHRONOUS NETWORKS

(71) Applicant: The Boeing Company, Chicago, IL (US)

(72) Inventors: Changzhou Wang, Bellevue, WA (US); Guijun Wang, Issaquah, WA (US); Arnold W. Nordsieck, Bellevue, WA (US); Yong-Long Calvin Ling, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 285 days.

(21) Appl. No.: 14/743,471

(22) Filed: Jun. 18, 2015

(65) Prior Publication Data
US 2016/0373367 A1 Dec. 22, 2016

(51) Int. Cl.
*H04L 12/875* (2013.01)
*H04L 12/863* (2013.01)
*H04L 12/70* (2013.01)
*H04L 12/26* (2006.01)

(52) U.S. Cl.
CPC .......... *H04L 47/56* (2013.01); *H04L 43/0852* (2013.01); *H04L 47/00* (2013.01); *H04L 47/621* (2013.01)

(58) Field of Classification Search
CPC ........ H04L 47/56; H04L 47/00; H04L 47/621
See application file for complete search history.

(56) References Cited

U.S. PATENT DOCUMENTS

2008/0151923 A1* 6/2008 Ignatowski ........... H04L 41/145
                                                              370/412
2010/0125656 A1* 5/2010 Karasaridis ......... H04L 67/1025
                                                              709/224

(Continued)

OTHER PUBLICATIONS

Jean-Yves Le Boudec; "Application of Network Calculus to Guaranteed Service Networks"; IEEE Transactions on Information Theory, vol. 44, No. 3; pp. 1087-1096; Lausanne, Switzerland (May 1998).

(Continued)

*Primary Examiner* — Omer S Mian
(74) *Attorney, Agent, or Firm* — Thompson Hine LLP

(57) ABSTRACT

A system for determining a worst case latency for a specific information flow that is part of a plurality of information flows and a worst case backlog for a specific queue that is part of a plurality of queues is disclosed. The plurality of information flows and plurality of queues are part of a configuration. The system performs operations including determining a maximum busy period length for the configuration. The operations include determining a set of candidate starting times for the configuration based on the maximum busy period length. The operations further include determining a maximum layout for a plurality of information flows within the configuration. The operations include updating the worst case latency and the worst case backlog based on the maximum layout. Finally, the operations include determining the worst case latency for the specific information flow and the worst case backlog for a specific queue.

18 Claims, 14 Drawing Sheets

(56) References Cited

U.S. PATENT DOCUMENTS

2011/0149995 A1* 6/2011 Francini .............. H04L 12/4013
370/465
2012/0155264 A1* 6/2012 Sharma ............... H04L 43/0852
370/232
2016/0294721 A1* 10/2016 Varadarajan, Sr. ... H04L 47/621

OTHER PUBLICATIONS

Hussein Charara et al.; "Methods for bounding end-to-end delays on an AFDX network"; 18th Euromicro Conference of Real-Time Systems; IEEE; 10 pages; Toulouse, France (2006).
Anne Bouillard et al.; "Tight performance bounds in the worst-case analysis of feed-forward networks"; INFOCOM, 2010 Proceedings IEEE; pp. 1-9; San Diego, CA (Mar. 14-19, 2010).
Jean-Yves Le Boudec et al.; "A Short Tutorial on Network Calculus, I: Fundamental Bounds in Communication Networks"; IEEE International Symposium on Circuits and Systems; pp. IV-93-IV-96; Geneva, Switzerland (May 28-21, 2000).
http://en.wikipedia.org/wiki/Little's_law (last modified Mar. 19, 2015).

* cited by examiner

SYSTEM AND METHOD FOR IDENTIFYING PERFORMANCE CHARACTERISTICS IN ASYNCHRONOUS NETWORKS

FIELD

The disclosed system relates to a system and method for identifying performance characteristics in asynchronous networks and, more particularly, to a system for determining a worst case latency of an information flow and a worst case backlog of a queue in a configuration of an asynchronous network.

BACKGROUND

An information flow includes of a sequence of messages generated at a given rate by a common source. Each message within a specific information flow contains one or more fragments. Each information flow may be assigned to a unique queue while waiting to be scheduled for transmission. Multiple queues may be defined to hold different groups of messages in multiple information flows. A computing system may process a set of information flows at a fixed rate, where the queues are processed by priority. Specifically, each queue may be assigned a priority such that messages located within in a high priority queue may be processed by the computing system before messages located within in a lower priority queue. However, it is to be understood that a fragment located within in a lower priority queue that is currently under processing may not be pre-empted by a fragment located within a higher priority queue. In other words, the computing system finishes processing the current fragment before a subsequent fragment having a higher priority is processed.

The latency of each message may be defined as its total waiting time within the computing system. The total waiting time of a message may be measured from the time the message is added to the system, which is referred to as the message's arrival time, to the time the message is removed from the system, which is referred to as the message's a departure time. The worst case latency of a specific information flow may be defined by the maximum latency of any of the messages located within the information flow, where messages may arrive at any time so long as all timing constraints are satisfied. The backlog of each queue may be defined as a total length of all of the messages waiting within the queue at a specific time. The worst case backlog of a specific queue may be defined by the maximum backlog of the queue at any time, where messages may arrive at any time so long as the messages satisfy all given timing constraints. The worst case latency and backlog may be used to verify and certify performance characteristics of certain safety systems such as, for example, flight control systems in an avionics system.

There are various approaches that may be used to analyze the latency of information flows as well as the backlog of queues processed by a computing system. However, these approaches may each have unique drawbacks that make them unsuitable for determining the worst case latency and backlog. For example, in one approach, a queuing theory such as Little's Law may be used to analyze the latency and backlog. When utilizing a queueing theory, it is assumed that messages arrive at a given probability distribution, and the processing time of the messages follows a given, but usually different, probability distribution. Accordingly, queuing theory may only be used to determine an average latency and backlog, instead of the worst case latency and backlog.

Network calculus is another approach for analyzing the latency of information flows as well as the backlog of queues processed by a computing system. Network calculus may derive pessimistic bounds based on the worst case latencies and backlogs. However, pessimistic bounds are often far from the real values of the worst case latencies and backlogs, and are not guaranteed to be reachable. Moreover, when pessimistic bounds are utilized, resources may be wasted or underutilized in order to ensure the pessimistic bounds of information flow latencies are small enough to meet latency requirements.

In yet another approach, simulation methods may be utilized to analyze the latency of information flows as well as the backlog of queues processed by a computing system. The maximum latency and backlog may be collected from numerous rounds of simulation. However, the maximum latencies and backlogs that are determined using simulation methods are not guaranteed to be the actual worst cases, since the real worst case scenario may never actually be generated during simulation. Indeed, it should be appreciated that simulations do not necessarily generate nor guarantee worst case scenarios. Therefore, latency and backlog parameters based on simulation may not be used as the basis for the verification and certification of system performance characteristics of safety systems.

Mathematical programming, such as mixed integer non-linear programming, has also been used to analyze the latency of information flows as well as the backlog of queues processed by a computing system. However, it may be challenging to create a high-fidelity model having the correct variables and parameters. Thus, there exists a continuing need in the art for an improved approach to determine the worst case latency of information flows and the worst case backlog of queues in a configuration processed by a computing system.

SUMMARY

In one aspect, a system for determining a worst case latency for a specific information flow that is part of a plurality of information flows is disclosed. The plurality of information flows are part of a configuration. The system includes a processor and a memory. The memory stores a scheduler and instructions. The instructions are executable by the processor to perform operations including determining a maximum busy period length for the configuration. The operations include determining a set of candidate starting times for the configuration based on the maximum busy period length. The operations further include determining a maximum layout for the plurality of information flows within the configuration except for the specific information flow. The operations include updating the worst case latency based on the maximum layout. Finally, the operations include determining the worst case latency for the specific information flow.

In another aspect, a system for determining a worst case backlog of a specific queue that is part of a plurality of queues in a configuration is disclosed. The configuration includes a plurality of information flows. The system includes a processor and a memory. The memory stores a scheduler and instructions, and the instructions are executable by the processor to perform operations comprising determining a maximum busy period length for the configuration. The operations also include determining a set of candidate starting times for the configuration based on the maximum busy period length. The operations further include determining the maximum layout for all of the plurality of information flows within the configuration. The operations include updating the worst case backlog with the maximum layout. Finally, the operations include determining the worst case backlog.

In still another aspect, a non-transitory computer readable medium for determining a worst case latency for a specific information flow that is part of a plurality of information flows of a configuration is disclosed. The computer readable medium comprises a computer program that when executed by a computer, causes the computer to determine a maximum busy period length for the configuration. The computer is also caused to determine a set of candidate starting times for the configuration based on the maximum busy period length. The computer is caused to determine a maximum layout for a plurality of information flows within the configuration except for the specific information flow. Finally, the computer is caused to update the worst case latency based on the maximum layout and determine the worst case latency for the specific information flow.

Other objects and advantages of the disclosed method and system will be apparent from the following description, the accompanying drawings and the appended claims.

DETAILED DESCRIPTION

Figure 1:
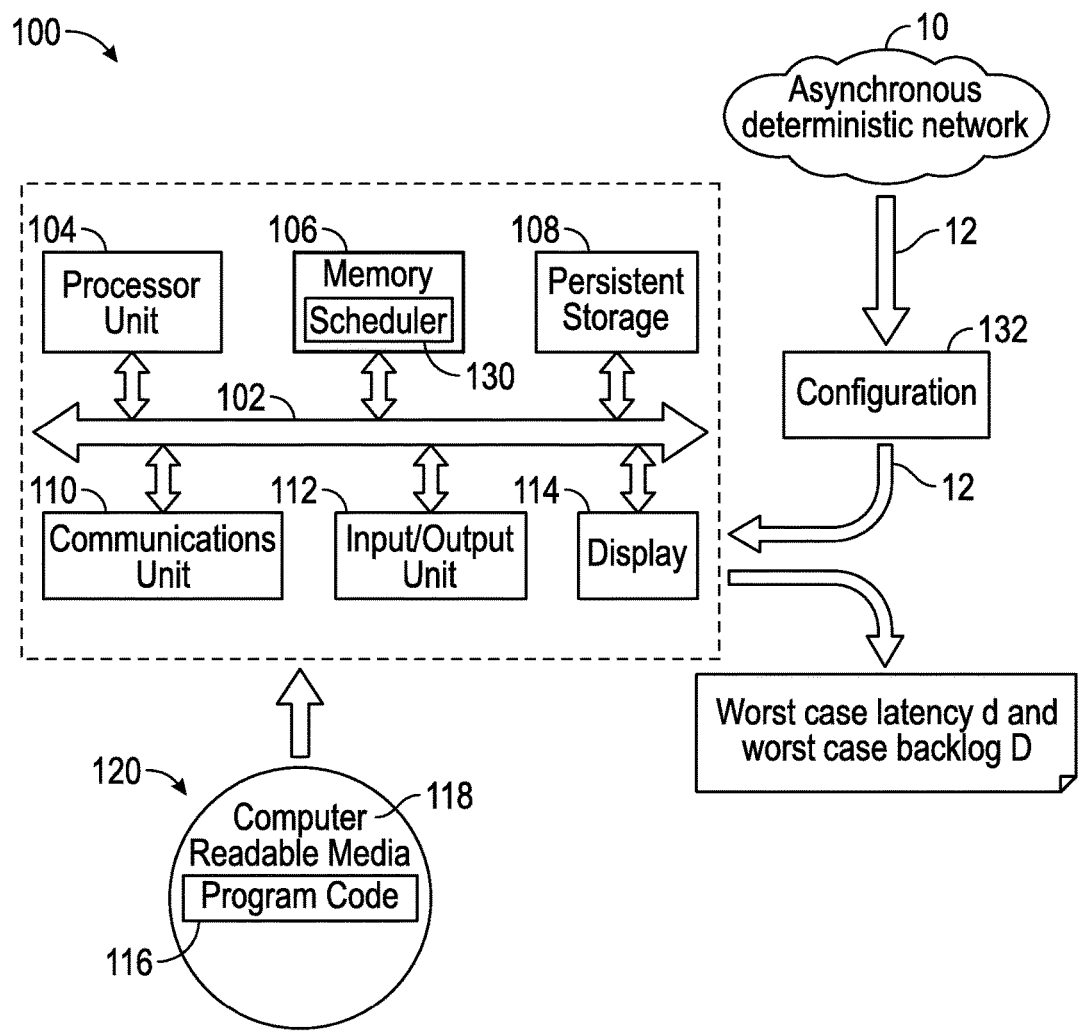
FIG. 1 is a block diagram illustrating an exemplary computing device for determining worst case scenarios of an asynchronous deterministic network.

FIG. 1 is a block diagram of an exemplary computing device 100. As explained in greater detail below, the computing device 100 may be used to determine worst case scenarios, such as a worst case latency d and a worst case backlog D of multi-priority, multi-fragment messages of an asynchronous deterministic network 10. As seen in FIG. 1, the computing device 100 may be in communication with the asynchronous deterministic network 10 through a communications link 12. Those of ordinary skill in the art will appreciate that in an asynchronous network, such as the asynchronous deterministic network 10 shown in FIG. 1, communication may be achieved based on a handshaking protocol without the need to use fixed-rate clock signals to coordinate the sending and receiving parties within the asynchronous network.

Although FIG. 1 illustrates the computing device 100 in communication with the asynchronous deterministic network 10, it is to be understood that the disclosed system and methods may be executed on any computing device with an asynchronous network configuration as input and that produces the worst case latency d and backlog D as output. It should also be appreciated that the computing device 100 may be connected to any type of asynchronous network, or may be isolated from the asynchronous deterministic network 10, as long as the input and the output of the computing device 100 may be facilitated via an I/O unit or a communications unit.

In the exemplary embodiment as illustrated in FIG. 1, the computing device 100 may include a communications fabric 102 that provides communications between a processor unit 104, a memory 106, persistent storage 108, a communications unit 110, an input/output (I/O) unit 112, and a presentation interface, such as a display 114. In addition to, or in the alternative, the presentation interface may include an audio device (not shown) and/or any device capable of conveying information to a user.

The processor unit 104 executes instructions for software that may be loaded into a storage device, such as the memory 106. The processor unit 104 may be a set of one or more processors or may include multiple processor cores, depending on the particular implementation. Further, the processor unit 104 may be implemented using one or more heterogeneous processor systems in which a main processor is present with secondary processors on a single chip. In another embodiment, the processor unit 104 may be a homogeneous processor system containing multiple processors of the same type.

The memory 106 and the persistent storage 108 are examples of storage devices. As used herein, a storage device is any tangible piece of hardware that is capable of storing information either on a temporary basis and/or a permanent basis. The memory 106 may be, for example, a non-volatile storage device. The persistent storage 108 may take various forms depending on the particular implementation, and the persistent storage 108 may contain one or more components or devices. For example, the persistent storage 108 may be a hard drive, a flash memory, a rewritable optical disk, a rewritable magnetic tape, and/or some combination of the above. The media used by the persistent storage 108 also may be removable. For example, without limitation, a removable hard drive may be used for the persistent storage 108.

A storage device, such as the memory 106 and/or the persistent storage 108, may store data for use with the processes described herein. For example, a storage device may store (e.g., have embodied thereon) computer-executable instructions, executable software components, configurations, layouts, schedules, or any other information suitable for use with the methods described herein. When executed by the processor unit 104, such computer-executable instructions and components cause the processor 104 to perform one or more of the operations described herein.

The communications unit 110, in these examples, provides for communications with other computing devices or systems. In the exemplary embodiment, the communications unit 110 is a network interface component. The communications unit 110 may provide communications through the use of either or both physical and wireless communication links.

The input/output unit 112 enables input and output of data with other devices that may be connected to the computing device 100. For example, without limitation, the input/output unit 112 may provide a connection for user input through a user input device, such as a keyboard and/or a mouse. Further, the input/output unit 112 may send output to a printer. The display 114 provides a mechanism to display information, such as any information described herein, to a user. For example, a presentation interface such as the display 114 may display a graphical user interface, such as those described herein.

Instructions for the operating system and applications or programs are located on the persistent storage 108. These instructions may be loaded into the memory 106 for execution by the processor unit 104. The processes of the different embodiments may be performed by the processor unit 104 using computer implemented instructions and/or computer-executable instructions, which may be located in a memory, such as the memory 106. These instructions are referred to herein as program code (e.g., object code and/or source code) that may be read and executed by a processor in the processor unit 104. The program code in the different embodiments may be embodied on different physical or tangible computer-readable media, such as the memory 106 or the persistent storage 108.

The program code 116 is located in a functional form on non-transitory computer-readable media 118 that is selectively removable and may be loaded onto or transferred to the computing device 100 for execution by the processor unit 104. The program code 116 and computer-readable media 118 form computer program product 120 in these examples. In one example, the computer-readable media 118 may be in a tangible form, such as, for example, an optical or magnetic disc that is inserted or placed into a drive or other device that is part of the persistent storage 108 for transfer onto a storage device, such as a hard drive that is part of the persistent storage 108. In a tangible form, the computer-readable media 118 also may take the form of a persistent storage, such as a hard drive, a thumb drive, or a flash memory that is connected to the computing device 100. The tangible form of the computer-readable media 118 is also referred to as computer recordable storage media. In some instances, the computer-readable media 118 may not be removable.

Alternatively, the program code 116 may be transferred to the computing device 100 from the computer-readable media 118 through a communications link to the communications unit 110 and/or through a connection to the input/output unit 112. The communications link and/or the connection may be physical or wireless in the illustrative examples. The computer-readable media also may take the form of non-tangible media, such as communications links or wireless transmissions containing the program code.

In some illustrative embodiments, the program code 116 may be downloaded over a network to the persistent storage 108 from another computing device or computer system for use within the computing device 100. For instance, program code stored in a computer-readable storage medium in a server computing device may be downloaded over a network from the server to the computing device 100. The computing device providing the program code 116 may be a server computer, a workstation, a client computer, or some other device capable of storing and transmitting the program code 116.

The program code 116 may be organized into computer-executable components that are functionally related. For example, the program code 116 may include one or more part agents, ordering manager agents, supplier agents, and/or any component suitable for practicing the methods described herein. Each component may include computer-executable instructions that, when executed by the processor unit 104, cause the processor unit 104 to perform one or more of the operations described herein.

The different components illustrated herein for the computing device 100 are not meant to provide architectural limitations to the manner in which different embodiments may be implemented. The different illustrative embodiments may be implemented in a computer system including components in addition to or in place of those illustrated for computing device 100. For example, other components shown in FIG. 1 can be varied from the illustrative examples shown. In one example, a storage device in the computing device 100 is any hardware apparatus that may store data. The memory 106, the persistent storage 108 and the computer-readable media 118 are examples of storage devices in a tangible form.

In another example, a bus system may be used to implement the communications fabric 102 and may include one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, the memory 106 or a cache such as that found in an interface and memory controller hub that may be present in the communications fabric 102

Continuing to refer to FIG. 1, a scheduler 130 may be stored in the memory 106 of the computing device 100. In the exemplary embodiment as shown, a configuration 132 may be provided to the computing device 100 via the I/O unit 112 or the communications unit 110. The scheduler 130 may be any computing device that produces a set of schedules S for a compliant layout based on a configuration 132. An explanation of a compliant layout is described in greater detail below. Some examples of schedulers that may be used and are known by those of ordinary skill in the art include, but are not limited to, a fair weighted round robin scheduler (FWRR) and a fair first-in-first-out (FFIFO) scheduler.

Figure 2:
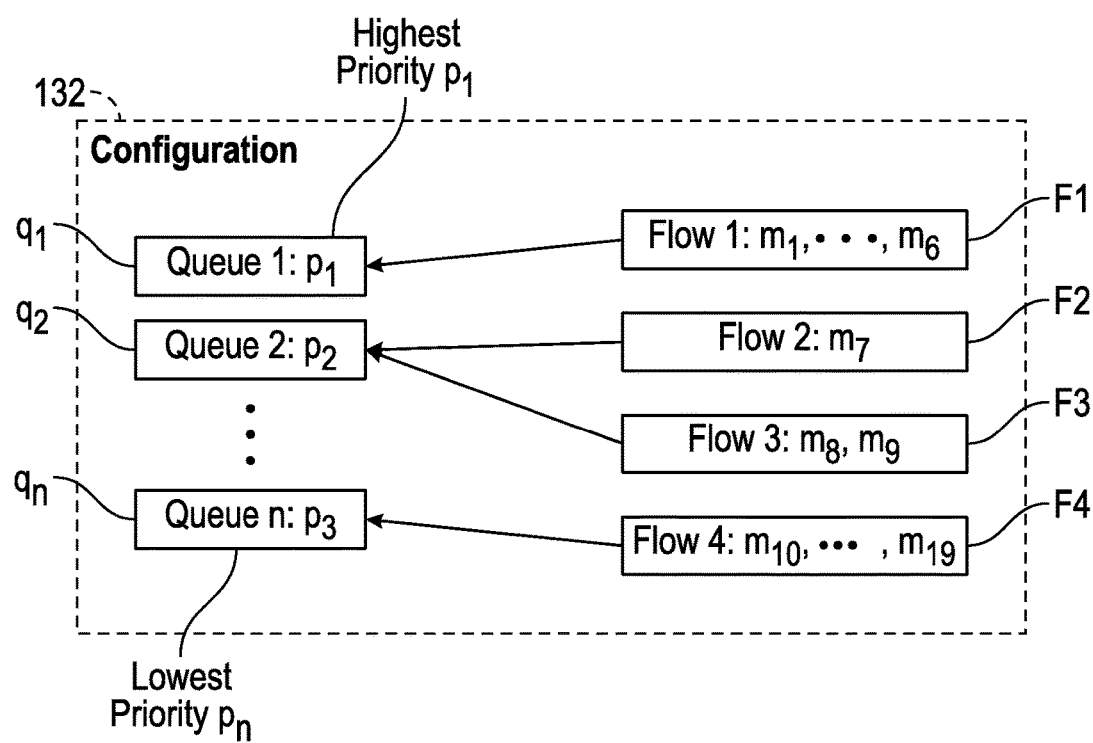
FIG. 2 is a block diagram illustrating a configuration shown in FIG. 1, where the configuration includes four information flows.

Turning now to FIG. 2, a block diagram illustrating an exemplary embodiment of the configuration 132 is shown. The configuration 132 may include an n number of queues q, where the number n may be any number more than one. Each queue q has a unique priority. The queues q are listed in decreasing priority. Specifically, in the example as illustrated, queue $q_1$ has the highest priority p1, and queue $q_n$ has the lowest priority $p_n$. Each queue q includes one or more information flows F. Each information flow F is assigned to a single queue q, and includes a sequence of one or more messages m generated from a single source at a given rate. For example, the first information flow F1 includes six messages, which are $m_1$-$m_6$, the information flow F2 includes a single message $m_7$, the third information flow F3 includes two information flows $m_8$ and $m_9$, and the fourth information flow F4 includes ten messages $m_{10}$-$m_{19}$. Each message m includes one or more fragments 146 (illustrated in FIG. 3). Referring to both FIGS. 2 and 3, each message m may be added to the asynchronous deterministic network 10 according to the configuration 132 as a batch of fragments 146. It is to be understood that the batch may arrive containing one or more messages m.

Figure 3:
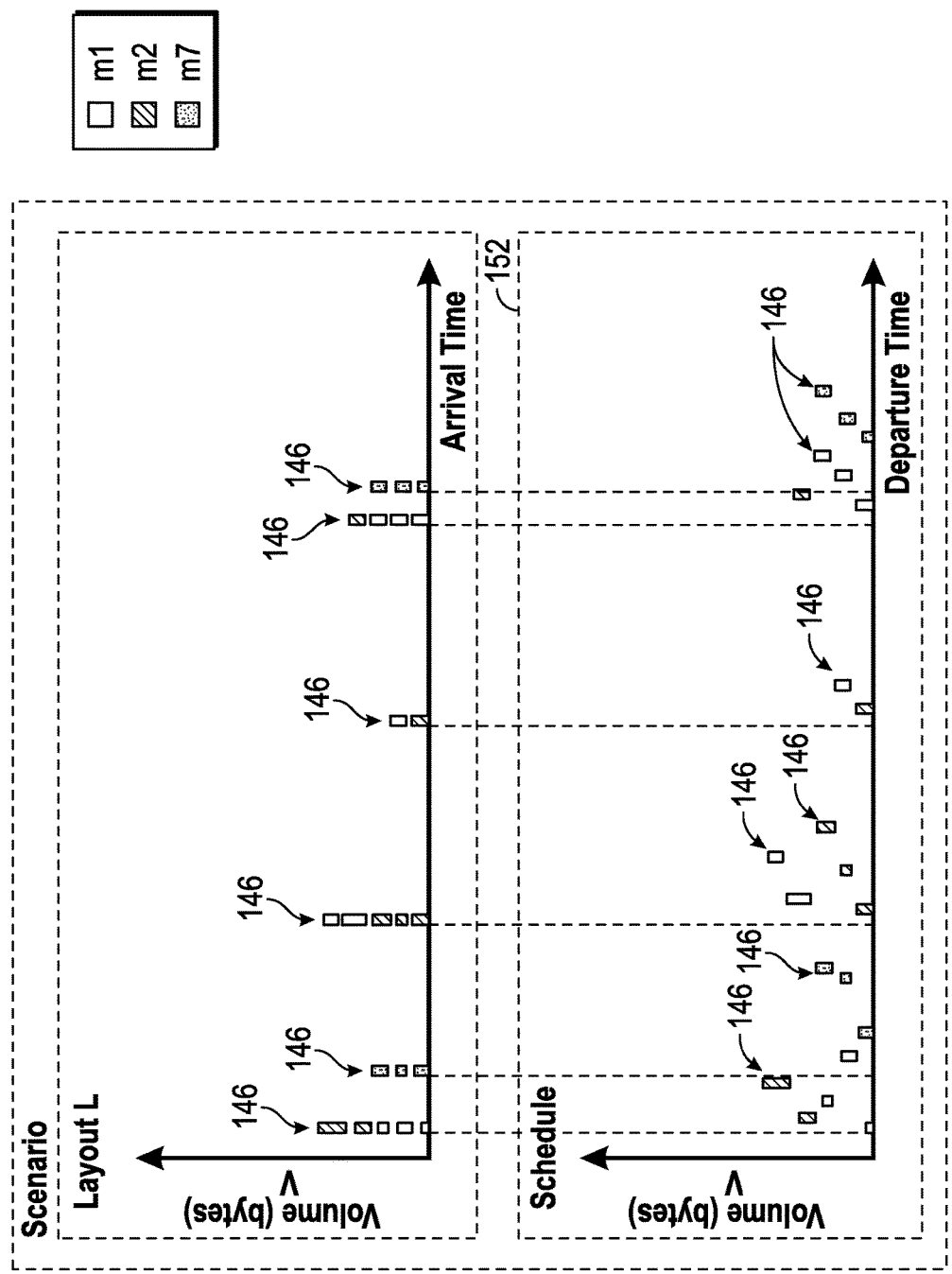
FIG. 3 is a schematic diagram of an exemplary scenario for a first information flow F1 and a second information flow F2 shown in FIG. 2.

FIG. 3 is an illustration of an exemplary scenario for the first information flow F1 and the second information flow F2 shown in FIG. 2. Specifically, the fragments 146 for messages $m_1$ and $m_2$, which are part of the first information flow F1, are illustrated in the scenario. Moreover, message $m_7$, which is part of the second information flow F2, is also illustrated in the scenario. It is to be understood that a scenario may be calculated for each information flow F (FIG. 2) to determine the worst case latency d for a specific information flow F. A scenario is also calculated for each queue q (FIG. 2) to determine the worst case backlog D.

The scenario includes a layout L and a schedule 152. The layout L defines an arrival time for each fragment 146 of one of the messages m, as well as a volume v of each fragment 146. The volume v of a single fragment 146 refers to the number of data units included in the single fragment 146. Each fragment 146 may contain no more than a predefined number of data units, which is referred to as a maximum volume in the configuration 132. In the exemplary illustration as shown in FIG. 3, the volume v of the fragments 146 are measured in bytes, however it is to be any other type of data unit may be used as well to measure the volume v of the fragments 146. The schedule 152 corresponds to the layout L, and defines a departure time for each fragment 146 included within the layout L.

Figure 4A:
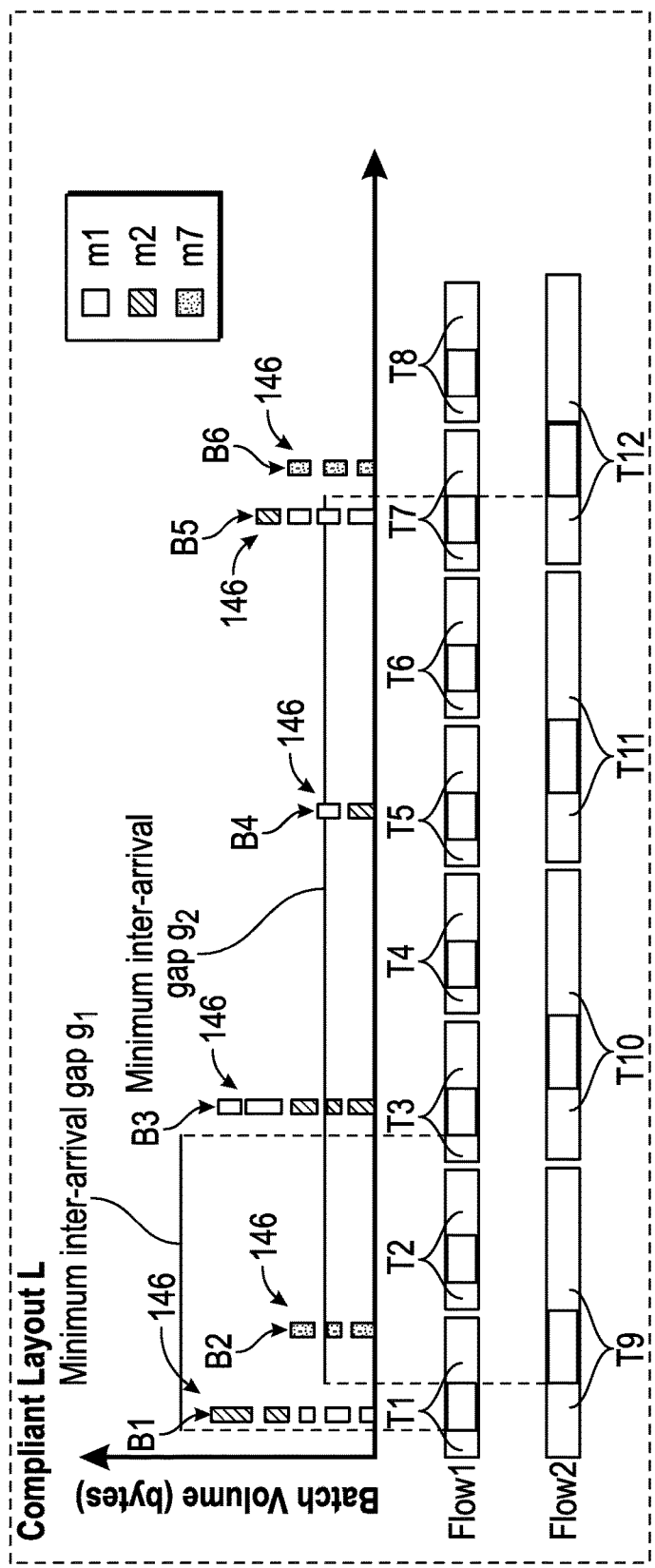
FIG. 4A is an illustration of a layout shown in FIG. 3, where the layout shown in FIG. 4A is a compliant layout.

FIG. 4A is an illustration of the layout L shown in FIG. 3, where the layout L is compliant and therefore may be referred to as a compliant layout. An explanation of a compliant layout is described in greater detail below. The messages $m_1$, $m_2$, and $m_7$ of the information flows F1, F2 may be transmitted as the batches B1-B6. However, it is to be appreciated that each batch may contain no more than a maximum number of fragments 146. The maximum number of fragments 146 may be referred as a maximum batch size of the configuration 132. For example, in the embodiment as shown in FIG. 4A, the first information flow F1 has a maximum batch size of five fragments 146, and batches B1, B3, B4, and B5 are part of the first information flow F1. Thus, as can be seen, the first batch B1 of fragments 146 includes a total of five fragments 146. More specifically, the first batch B1 includes three fragments 146 that correspond to the first message $m_1$ and two fragments 146 that correspond to the second message $m_2$ of the first information flow F1. The fourth batch B4 of fragments 146 includes two fragments 146, which is less than the maximum batch size of five fragments 146 for the information flow F1 in the configuration 132.

The maximum batch size of the second information flow F2 is three fragments 146, and batches B2 and B6 are part of the second information flow F2. Thus, as can be seen in FIG. 4A, the second batch B2 of fragments 146 includes three fragments 146 that each correspond to the seventh message $m_7$ of the second information flow F2 and the sixth batch B6 also only includes three fragments 146 that that each correspond to the seventh message $m_7$.

Continuing to refer to FIG. 4A, each batch of fragments 146 may arrive in periodic arrival windows T arranged along a time line. Each arrival window T may have a fixed length. However, it is to be understood that the different information flows F may each include arrival windows T of different lengths. For example, in the embodiment as illustrated the arrival windows T of the second information flow F2 are about twice as long as the arrival window T of the first information flow F1. For each information flow F, the time line may be split by consecutive, non-overlapping arrival windows T, where the arrival windows within each information flow F have the same length. In FIG. 4A, the time line includes eight arrival windows T1-T8 for the first information flow F1, and four arrival windows T9-T12 for the second information flow F2. It is to be understood that only one of the batches B1-B6 of may arrive at any arrival window T. In addition, the batches B for each information flow F may not arrive at every arrival window T. For example, in the embodiment as shown in FIG. 4A, batches of fragments 146 may only arrive at arrival windows T1, T3, T5 and T6 in the first information flow F1 (e.g., batches B1, B3, B4, and B5). Similarly, batches of fragments 146 may only arrive at arrival window T9 and T12 in the second information flow F2 (e.g. batches B2 and B6).

Figure 4B:
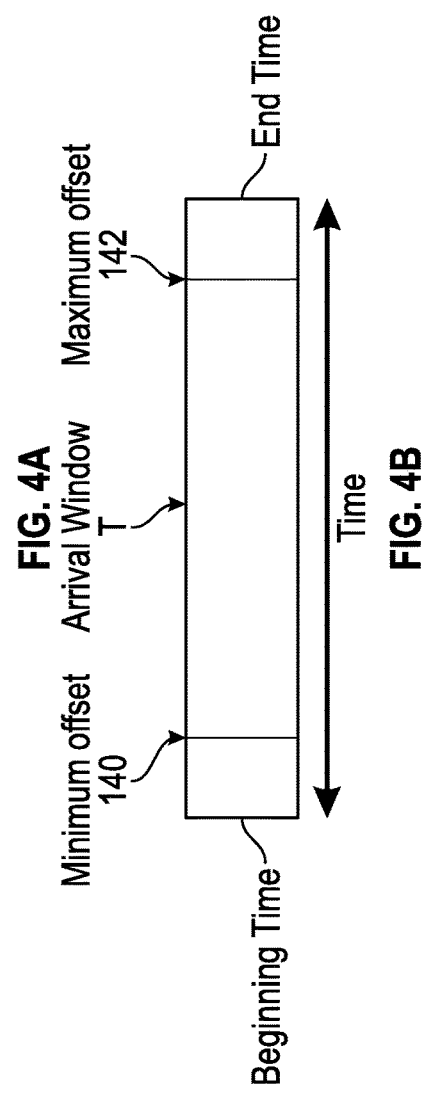
FIG. 4B is an enlarged view of one of the arrival windows shown in FIG. 4A.

FIG. 4B is an enlarged view of a single exemplary arrival window T. It should be understood that at most a single batch of fragments 146 may arrive within any arrival window T for a specific information flow. Additionally, a single batch of fragments 146 may arrive no earlier than a minimum offset 140, and no later than a maximum offset 142 within the arrival window T. As seen in FIG. 4B, the minimum offset 140 is located no earlier than a time when the arrival window T begins, and the maximum offset 142 is located no later than to a time when the arrival window T ends. As illustrated in FIGS. 4A and 4B, a single batch B of fragments 146 may arrive between the minimum offset 140 and maximum offset 142 of any arrival window T, so long as the arrival time between any two consecutively arrived batches B is greater than a minimum inter-arrival time for any information flow F. A minimum inter-arrival time gap is illustrated in FIG. 4A and is described in greater detail below.

Referring to FIG. 4A, a minimum inter-arrival time gap g may be specified in the configuration 132 between any two consecutively-arrived batches of the same information flow F. For example, the first information flow F1 includes a minimum inter-arrival time gap $g_1$ of two arrival windows. In other words, there is a minimum of two arrival windows T1 and T2 between the batches B1 and B3. The batches B1 and B3 contain the fragments 146 for the first information flow F1. Furthermore, there are also two arrival windows T3 and T4 located between the third batch B3 and the fourth batch B4, as well as between the fourth batch B4 and the fifth batch B5. The second information flow F2 includes a minimum inter-arrival time gap $g_2$ of three arrival windows T, which are a different length in comparison to the arrival windows for the information flow F1. In other words, there is a minimum of three arrival windows T9, T10 and T11 between the batches B2 and B6. The batches B2 and B6 contain the fragments 146 for the second information flow F2.

In the embodiment as shown, the configuration is harmonic, which means that the minimum inter-arrival time gap g of each information flow F is an integer multiple of a length of the arrival window T, and there is a common integer multiple for all of the minimum inter-arrival time gaps g. For example, the minimum inter-arrival time gap $g_1$ of the first information flow F1 is an integer multiple (e.g., two) of the length of the arrival windows T1-T8. Moreover, it is also to be understood that the layout L shown in FIG. 4A is a compliant layout, which means that the fragments 146 satisfy a group of constraints. The group of constraints includes, for example, the maximum batch size, the maximum volume of a fragment 146, the length of the arrival window T, the minimum offset 140 (FIG. 4B), the maximum offset 142 (FIG. 4B), and the minimum inter-arrival time gap g between batches of the same information flow F.

Referring to generally to FIGS. 2, 3, and 4A, the schedule 152 may be a well-formed schedule if every fragment 146 is scheduled to depart no earlier than its scheduled arrival time, and if an inter-departure time gaps for any two consecutively departed batches B is sufficient for the asynchronous deterministic network 10 (shown in FIG. 1) to process each fragment 146 in the batch B at a time with respect to a processing rate R. The processing rate R may be based on the specific configuration 132. Thus, it is to be appreciated that only one fragment 146 may depart at a time, and the fragments 146 may be processed as a whole. This means that a specific fragment 146 being processed may not be pre-empted by another fragment 146, which may have a higher priority, arriving in the configuration 132.

A specific batch of a selected information flows F in the configuration 132 may be defined as a maximum batch if a specific batch B includes the maximum batch size of fragments 146 allowed by a selected information flows F (e.g., the first information flow F1 may include a maximum number of 5 fragments 146), and each fragment 146 in the batch has the maximum volume allowed by the configuration 132 (FIG. 3). Moreover, the layout L may be defined as a maximum layout L for a selected information flow F during a given period of time in the configuration 132 if all of the batches B for the selected information flows F1 in the given period of time are maximum batches, the first batch B1 of the selected information flow F starts at a beginning of the given period of time, and the inter-arrival time gap measured between of any two batches for the information F is equal to the minimum inter-arrival time gap specified in the configuration 132.

Each message m may include a latency. The latency of a specific message m is a total waiting time of the specific message m within a specific queue q. The latency may be measured from the time when the message m arrives to the time when the message m departs. The worst case latency of each information flow F in a given schedule is the maximum latency of any message m within the information flow F. It is to be appreciated that the messages m within the specific information flow F as well as the remaining information flows F may arrive at any time, so long as the group of constraints are satisfied. In addition to latency, each queue q may have a backlog. The backlog of each queue q is a total volume of the messages m that are waiting within the queue q at any specific time. The worst case backlog D of each queue q is the maximum backlog of the specific queue q over all time, where the messages m of any information flow F may have arrive at any time so long as the group of constraints are satisfied.

It is to be appreciated that the processor unit 104 of the computing device 100 (FIG. 1) may determine the worst case latency d of each information flow F in a given schedule, as well as the worst case backlog D of each queue q. It is to be appreciated that the worst case latency d of each information flow F in a given schedule, as well as the worst case backlog D of each queue q may be determined by the processor unit 104 in parallel with one another. In other words, the worst case latency of each information flow F and the worst case backlog D of each queue q may be determined at the same time by the processor unit 104. However, the process to determine the worst case latency d as well as the worst case backlog D are explained separately from one another for clarity and simplicity.

Figure 5:
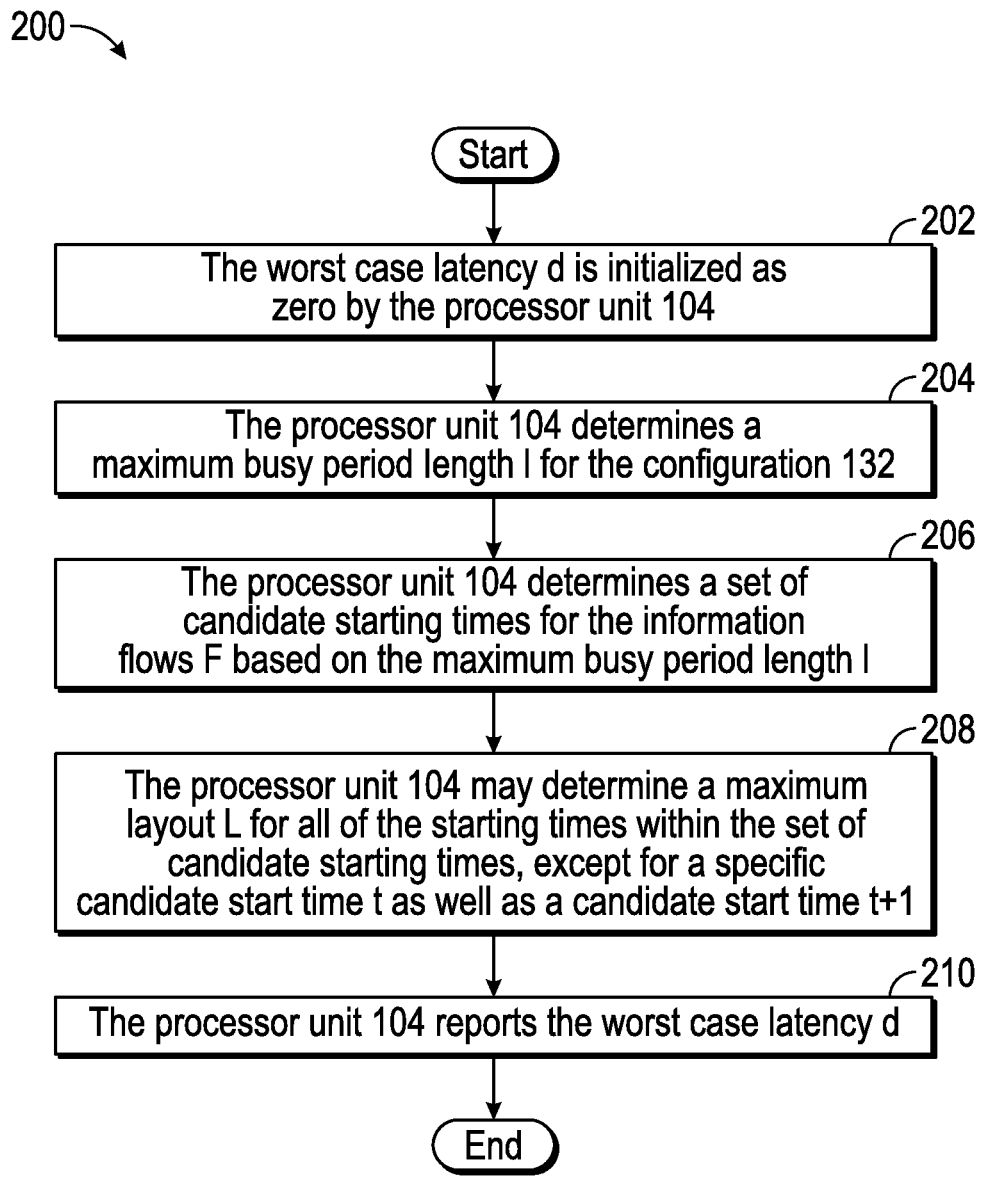
FIG. 5 is an exemplary process flow diagram illustrating a method for determining a worst case latency of each information flow in the configuration shown in FIG. 2.

Turning now to FIG. 5, an exemplary process flow diagram illustrating a method 200 for determining the worst case latency d of a single information flow F in the configuration 132 (FIG. 2) is illustrated. For example, method 200 determines the worst case latency d for the first information flow F1. Referring generally to FIGS. 1-5, method 200 may begin at block 202, where the worst case latency d of a specific information flow F (e.g., the first information flow F1) is initialized as zero by the processor unit 104. Method 200 may then proceed to block 204.

Figure 6:
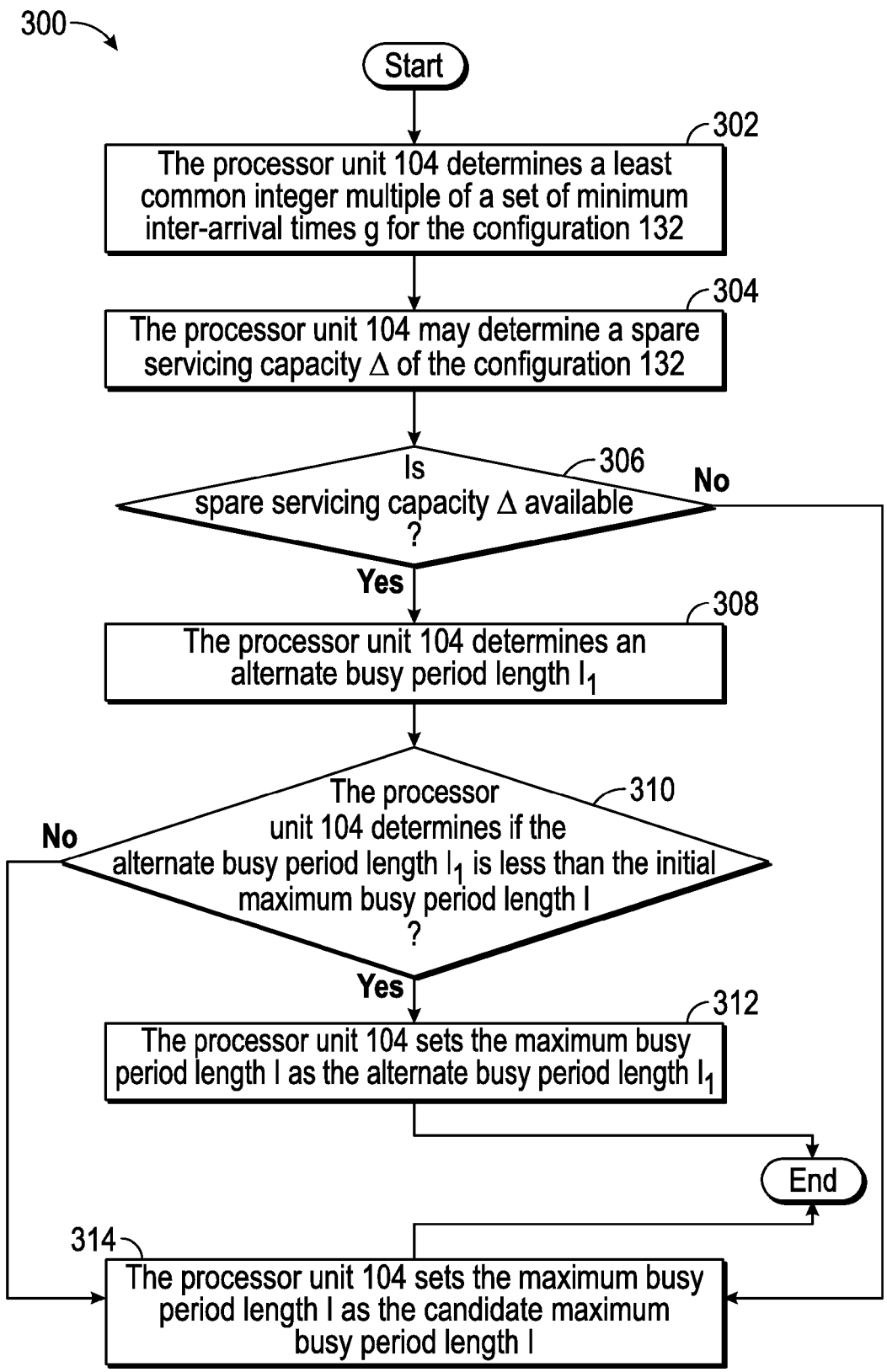
FIG. 6 is an exemplary process flow diagram illustrating a method for determining a maximum busy period length as described in the method shown in FIG. 5.

In block 204, the processor unit 104 may determine a maximum busy period length l for the configuration 132. A busy period may be the time span during which the asynchronous deterministic network 10 is busy processing incoming fragments 146 without idling. The maximum busy period length l is the maximum length of all possible busy periods. The method of determining the maximum busy period length l is described in greater detail below, and a process flow diagram illustrating a method 300 for determining the maximum busy period length l is illustrated in FIG. 6. Once the maximum busy period length l is determined, method 200 may then proceed to block 206.

Figure 7:
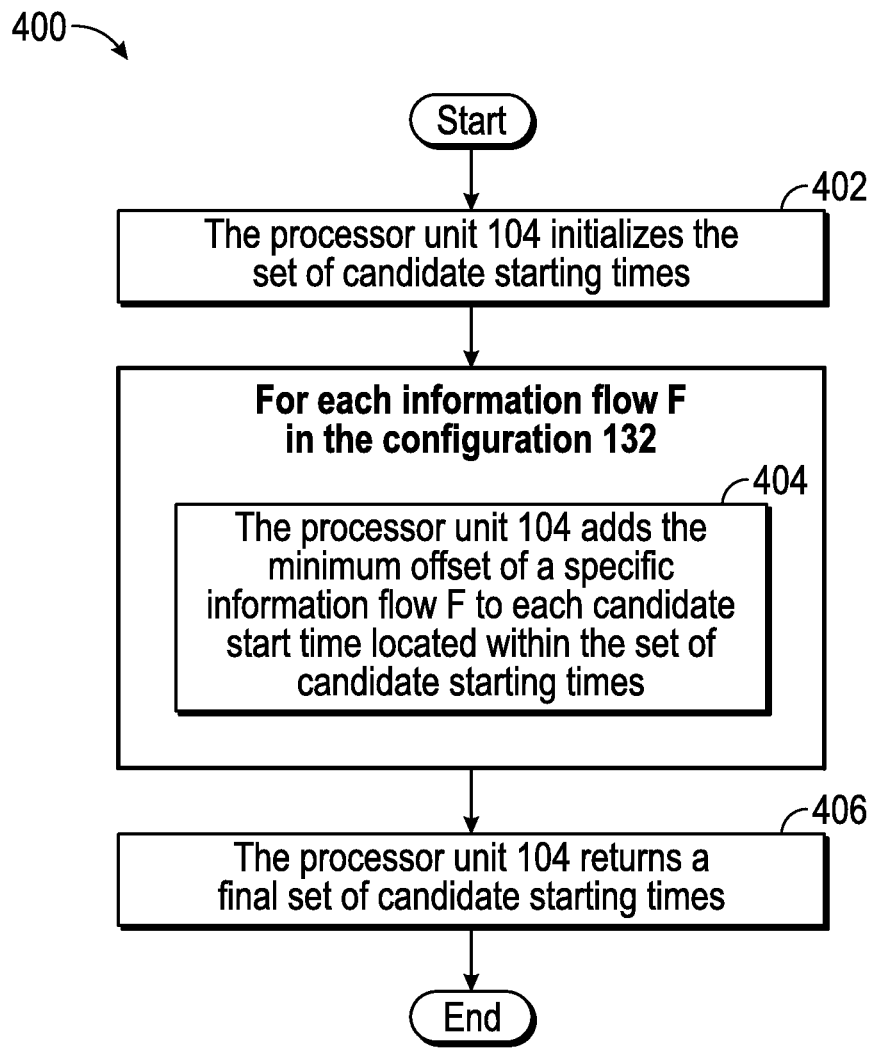
FIG. 7 is an exemplary process flow diagram illustrating a method for determining a set of candidate starting times.

In block 206, the processor unit 104 may determine a set of candidate starting times for the configuration 132 based on the maximum busy period length l determined in block 204. The method of determining the set of candidate starting times is described in greater detail below, and a process flow diagram illustrating an exemplary method 400 for determining the set of candidate starting times is illustrated in FIG. 7. A candidate starting time may be the starting time of a candidate busy period, and the candidate busy period may be a busy period where the latency of the information flow F1 includes the worst case latency d for any layout compliant within the configuration 132. Once the set of candidate starting times is determined, method 200 may then proceed to block 208.

Figure 8:
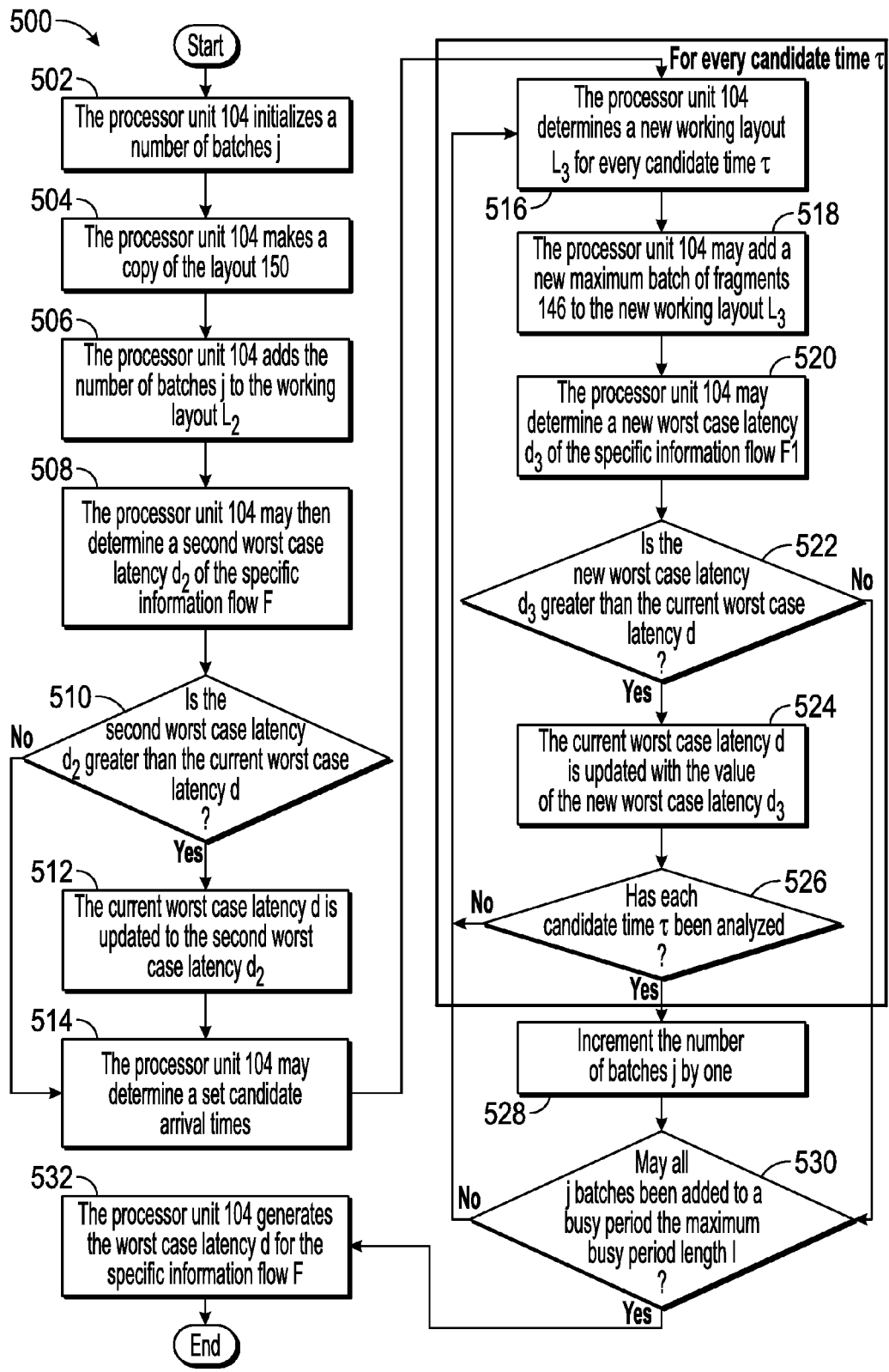
FIG. 8 is an exemplary process flow diagram illustrating a method of updating the worst case latency for a specific information flow.

In block 208, the processor unit 104 may determine the maximum layout L for all of the information flows F within the configuration 132, except for the specific information flow F that the worst case latency d is being determined for (e.g., the first information flow F1). The specific information flow F starts at a candidate busy period starting at one of the candidate starting times t and ending right before t+1, where l is the maximum busy period length. The processor unit 104 may then update the worst case latency d using the maximum layout L as an initial layout. A method of updating the worst case latency d using the maximum layout L is described in greater detail below and is illustrated in FIG. 8. Method 200 may proceed to block 210.

In block 210, the processor unit 104 may then report the worst case latency d via the communications unit 110, the I/O unit 112, or the display 114 of the computing device 100 shown in FIG. 1. Method 200 may then terminate.

FIG. 6 is an exemplary process flow diagram illustrating the method 300 for determining the maximum busy period length l as described in block 204 of method 200. Referring generally to FIGS. 1-4B and 6, method 300 may begin at block 302, where the processor unit 104 determines a least common integer multiple of a set of minimum inter-arrival times g for the configuration 132 (shown in FIG. 4A). More specifically, the processor unit 104 determines the least common integer multiple for all of the minimum inter-arrival times g within the configuration being analyzed, which is the configuration 132 in the present example, as the initial maximum busy period length l. Method 300 may then proceed to block 304.

In block 304, the processor unit 104 may then determine a spare servicing capacity Δ of the configuration 132. The spare servicing capacity Δ may be determined by subtracting a maximum servicing capacity of the asynchronous deterministic network 10 by a sum of processing demands for all the information flows F. The maximum servicing capacity may be specified as a maximum or fastest possible processing rate R of the configuration 132. It is to be understood that the processing demand for a specific information flow F is a maximum total number of data units of all fragments 146 within a single batch B, divided by the minimum inter-arrival time gap g for the specific information flow F (seen in FIG. 4A, where the minimum inter-arrival time gap $g_1$ of the first information flow F1 is two arrival windows). The maximum total number of data units of all fragments within a single batch for the flow F is the maximum volume v of the fragments 146, multiplied by the maximum batch size c for the flow F. The minimum inter-arrival times g, the maximum volume of each fragment 146, and the maximum batch size are specified in the configuration 132. Method 300 may then proceed to block 306.

In block 306, the processor unit 104 determines if there is spare servicing capacity Δ (i.e., if Δ>0). In the event there is no spare servicing capacity Δ, then method 300 may proceed to block 314, where the processor unit 104 sets an initial maximum busy period length l as a candidate maximum busy period length l, which is saved in the memory 106 of the computing device 100. Method 300 may then terminate.

In the event there is spare servicing capacity Δ, then method 300 may proceed to block 308. In block 308, then the processor unit 104 may determine an alternate busy period $l_1$. The alternate busy period $l_1$ may be determined as the sum of processing demands for all information flows F multiplied by the minimum integer that is greater than the reciprocal of the spare servicing capacity Δ, or 1/Δ. Method 300 may then proceed to block 310.

In block 310, the processor unit 104 may determine if the alternate busy period $l_1$ determined in block 308 is less than the initial maximum busy period length l. If the alternate busy period $l_1$ is less than the initial maximum busy period l, then method 300 may proceed to block 312.

In block 312, the processor unit 104 sets the maximum busy period l as the alternate busy period $l_1$, which is saved in the memory 106 of the computing device 100, and method 300 may then terminate. However, if the alternate busy period $l_1$ is not less than the initial maximum busy period l, then method 300 may proceed to block 314. In block 314, the processor unit 104 sets the initial maximum busy period length l as the candidate maximum busy period length l, which is saved in the memory 106 of the computing device 100. Method 300 may then terminate.

FIG. 7 is an exemplary process flow diagram illustrating a method 400 for determining the set of candidate starting times as described in block 206 of method 200 shown in FIG. 5. It is to be understood that each candidate starting time in the set of candidate starting times may be located within a given period starting at time zero and includes a length equal to the maximum busy period length l determined in method 300. Referring generally to FIGS. 1-4B and 7, method 400 may begin at block 402, where the processor unit 104 initializes the set of candidate starting times as an empty set. Method 400 may then proceed to block 404 in order to add candidate starting times one by one to the set.

In block 404, the processor unit 104 adds all candidate starting times over all arrival windows of the specific information flow F within the given period of time to a working set of candidate starting times. For an arrival window T of a specific information flow F in the configuration 132, the beginning time of the arrival window T (FIG. 4B) plus the minimum offset 140 (FIG. 4B) of the information flow F is a candidate starting time of the arrival window T. The processor unit 104 may continue to execute block 404 until the minimum offset 140 is added for all of the information flows F in the configuration 132. Method 400 may then proceed to block 406.

In block 406, the processor unit 104 returns a final set of candidate starting times. Method 400 may then terminate.

FIG. 8 is an exemplary process flow diagram illustrating a method 500 of updating the worst case latency d for a specific information flow F (e.g., the information flow F1) using the maximum layout L, as described in block 208 of method 200 shown in FIG. 5. Referring generally to FIGS. 1-4B and 8, method 500 may begin at block 502, where the processor unit 104 initializes a number of batches j to one. The number of batches j represents the number of batches to be added to a busy period with the maximum busy period length l, and is the number of batches within the specific information flow F under consideration. For example, referring to FIG. 4A, if the specific information flow is the first information flow F1, then the batches under consideration would include the first batch B1, the third batch B3, the fourth batch B4, and the fifth batch B5 (i.e., the number of batches j would be four). Method 500 may then proceed to block 504.

In block 504, the processor unit 104 makes a copy of the layout L (FIG. 3). The copy of the layout L may be referred to as a working layout $L_2$. Method 500 may then proceed to block 506.

In block 506, the processor unit 104 adds the maximum batches of the fragments 146 for the specific flow F to the working layout $L_2$ such that the working layout $L_2$ is a maximum layout up to a beginning of the j-th added batch. In other words, a first batch is added at the beginning of the given busy period, and succeeding batches (e.g., (j−1)) may be added if the inter-arrival gap between the batches is equal to the minimum inter-arrival gap g specified in the configuration 132 (shown in FIG. 4A). Method 500 may then proceed to block 508.

Figure 9:
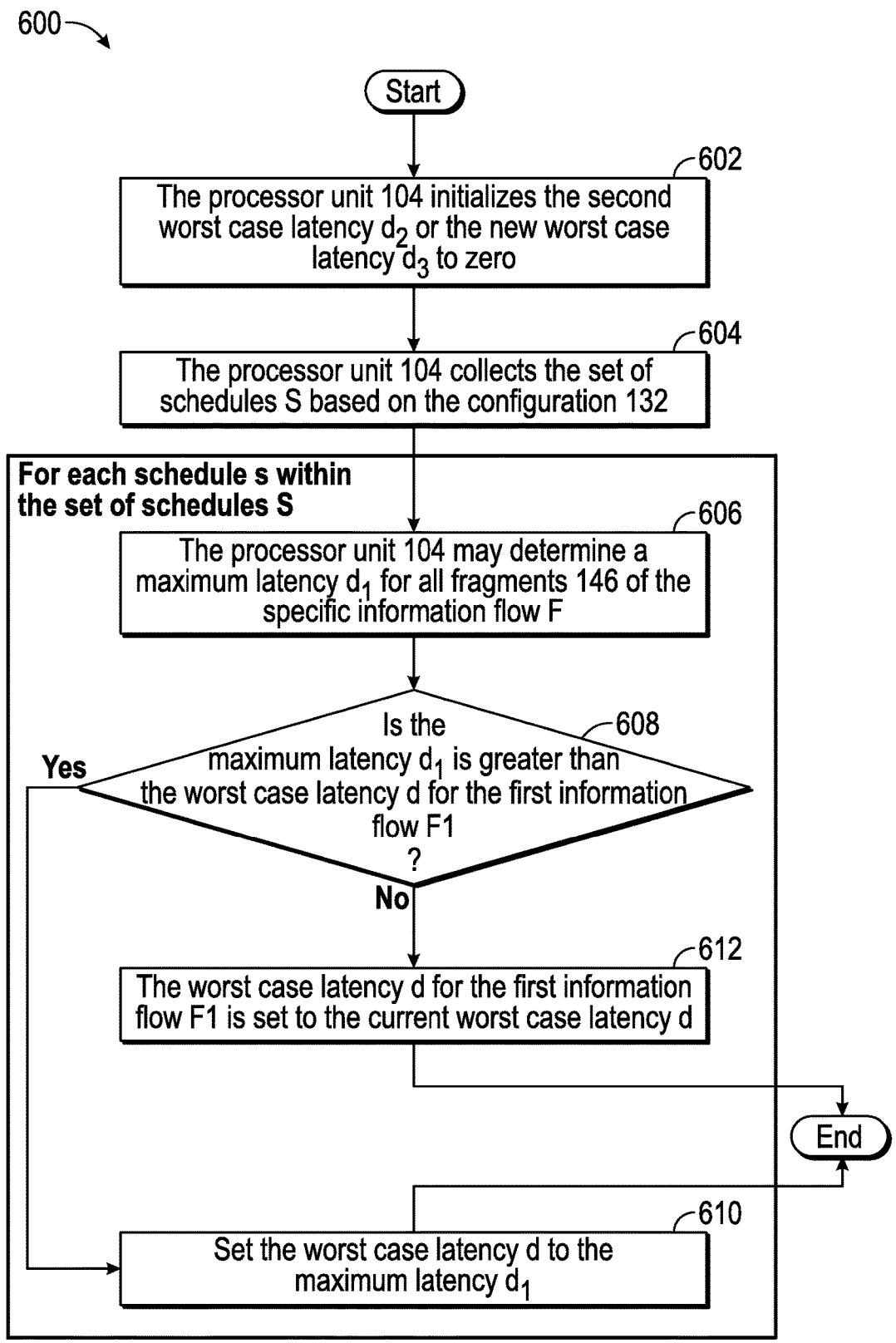
FIG. 9 is an exemplary process flow diagram illustrating a method of determining a new worst case latency of the specific information flow.

In block 508, the processor unit 104 may then determine a second worst case latency $d_2$ of the specific information flow F (in the present example the specific information flow F is the first information flow F1 shown in FIG. 2). A method of determining the second worst case latency $d_2$ of the specific information flow F is described in greater detail below and is illustrated in FIG. 9. Method 500 may then proceed to block 510.

In block 510, the processor unit 104 determines if the second worst case latency $d_2$ is greater than the current worst case latency d. If the second worst case latency $d_2$ is greater than the current worst case latency d, then method 500 may proceed to block 512. In block 512, the current worst case latency d is updated to the second worst case latency $d_2$. Method 500 may then proceed to block 514, which is described in greater detail below. However, if the second worst case latency $d_2$ is less than or equal to the current worst case latency d, then method 500 may proceed to block 514.

In block 514, the processor unit 104 may determine a set of candidate arrival times for adding a new batch of fragments 146 of the specific information flow F to the working layout $L_2$. Specifically, the processor unit 104 collects a full set of arrival times for all of the fragments 146 for all of the information flows F within the working layout $L_2$, and then collects arrival times from the full set of arrival times that are within a given period of time into the set of candidate arrival times for adding a new batch of fragments 146. The given period of time may start from the arrival time of the j-th added batch, which is described in block 506 above, plus the minimum inter-arrival time g. The length of the given period of time may equal the minimum inter-arrival time g. Method 500 may then proceed to block 516.

In block 516, the processor unit 104 may analyze each candidate time τ located within in the set of candidate arrival times collected in block 514. Specifically, the processor unit 104 may determine a new working layout $L_3$ for every candidate time τ in the subset of candidate arrival times collected in block 514. Method 500 may then proceed to block 518.

In block 518, the processor unit 104 may add a new maximum batch of fragments 146 arriving at time τ to the new working layout $L_3$. Method 500 may then proceed to block 520.

In block 520, the processor unit 104 may determine a new worst case latency, which is denoted as $d_3$, of the specific information flow F1. The specific method of determining the new worst case latency $d_3$ is described in greater detail below and is shown in FIG. 9. Method 500 may then proceed to block 522.

In block 522, the processor unit 104 determines if the new worst case latency $d_3$ is greater than the current worst case latency d. If the new worst case latency $d_3$ is not greater than the current worst case latency d, then method 520 may then proceed to block 526. However, if the new worst case latency $d_3$ is greater than the current worst case latency d, then method 500 may proceed to block 524. In block 524, the current worst case latency d is updated with the value of the new worst case latency $d_3$. Method 520 may then proceed to block 526.

In block 526, the processor unit 104 determines if each candidate time τ in the set of candidate arrival times collected in block 514 has been analyzed. If any of the candidate times τ has not been analyzed, then method 500 may return to block 516. However, if each candidate time τ has been analyzed, then method 500 may proceed to block 528.

In block 528, the processor unit 104 may increment the number of batches j by one. Method 500 may then proceed to block 530.

In block 530, the processor unit 104 may determine if all the j batches may be added within a busy period of the maximum busy period length l. For example, if the maximum busy period length l is 100 seconds, and the minimum inter-arrival gap is 30 seconds for the information flow F1, then at most four batches can be added. Thus, the processor unit 104 may determine if all four batches within the first information flow F1 have been added. If not all of the j batches have been added, then method 500 may return to block 516. However, if all of the j batches have been added, method 500 may then proceed to block 532.

In block 532, the processor unit 104 generates the worst case latency d for the specific information flow F. For example, in the present embodiment, the processor 104 would determine the worst case latency d for the first information flow F1. Method 500 may then terminate.

FIG. 9 is an exemplary process flow diagram illustrating a method 600 of determining either the second worst case latency $d_2$ as described in block 508 of method 500, or the new worst case latency $d_3$ of the specific information flow F as described in block 514 of method 500. Referring generally to FIGS. 1-4B and 9, method 600 may begin at block 602, where the processor unit 104 initializes the second worst case latency $d_2$ or the new worst case latency $d_3$ to zero. Method 600 may then proceed to block 604.

In block 604, the processor unit 104 collects the set of schedules S based on the configuration 132, which are generated by the scheduler 130 (FIG. 1). Method 600 may then proceed to block 606.

In block 606, the processor unit 104 may then determine a maximum latency $d_1$ for all fragments 146 of the specific information flow F of each schedule s within the set of schedules S. Method 600 may then proceed to block 608.

In block 608, the processor unit 104 may determine if the maximum latency $d_1$ is greater than the current worst case latency d for the information flow F. If the maximum latency $d_1$ is not greater than the worst case latency d for the information flow F, then method 600 may proceed to block 610. In block 610, the worst case latency d for the information flow F is set to the current worst case latency d, and method 600 may then terminate. However, if the maximum latency $d_1$ is greater than the worst case latency d for the information flow F, then method 600 may proceed to block 612.

In block 612, the processor unit 104 may set the worst case latency d to the maximum latency $d_1$. Method 600 may then terminate.

Referring generally to the figures, it is to be appreciated that the disclosed method as described above and illustrated in FIGS. 5-9 determines the worst case latency d for any information flow F in a harmonic, stable configuration for any work-conserving, isolable, consistent, and latency monotone scheduler (such as the scheduler 130 illustrated in FIG. 1). A well-formed schedule for a compliant layout of a specific configuration may be considered work-conserving if the messages depart in any busy period at a maximum processing speed specified by the specific configuration. The busy period may be defined as a period of time when the computing system is not in idle. Those of ordinary skill in the art will appreciate that a configuration is considered stable if an upper bound exists for the backlog of all queues in any work-conserving, well-formed schedule of any compliant layout.

It should also be appreciated that the scheduler 130 is considered work-conserving if all of the schedules S generated by the scheduler 130 for a given compliant layout are also work-conserving. Moreover, it should also be appreciated that the scheduler 130 may be considered isolable if, for any schedule produced for a given compliant layout and a given busy period, the scheduler is capable of creating a schedule where fragments within the given busy period is the same as in the given schedule for a new layout, which only includes fragments of the given layout within a given period of time. Also a scheduler may be considered consistent if, for any pair of layouts with the same set of fragments except a fixed arrival time shift between corresponding pair of fragments in the pair of layouts, the pair of schedules produced by the schedule for these layouts are the same, except for a fixed time shift between their respective departure times.

The scheduler 130 for a given configuration may be considered latency monotone if any pair of compliant layouts of a specific configuration, for which the scheduler 130 generates a first schedule for a first layout and a second schedule for a second layout, meets three requirements. The first requirement is the first layout and the second layout are identical, except that the first layout includes an extra fragment, and any fragment in the second schedule departs no later than the corresponding fragment in the first schedule. The second requirement is the first layout and the second layout are identical, except that the first layout may include a fragment having a larger volume than a corresponding fragment of the second layout, and that any fragment in the second schedule depart no later than the corresponding fragment in the first schedule. Finally, the third requirement is that the first layout and the second layout are identical, except that for a single pair of corresponding batches, the batch corresponding to the first layout arrives earlier than the batch corresponding to the second layout, and there is no other batches of fragments that arrive in the configuration between the pair of corresponding batches. Also, any fragment in the second schedule departs no later than the corresponding fragment in the first schedule.

Figure 10:
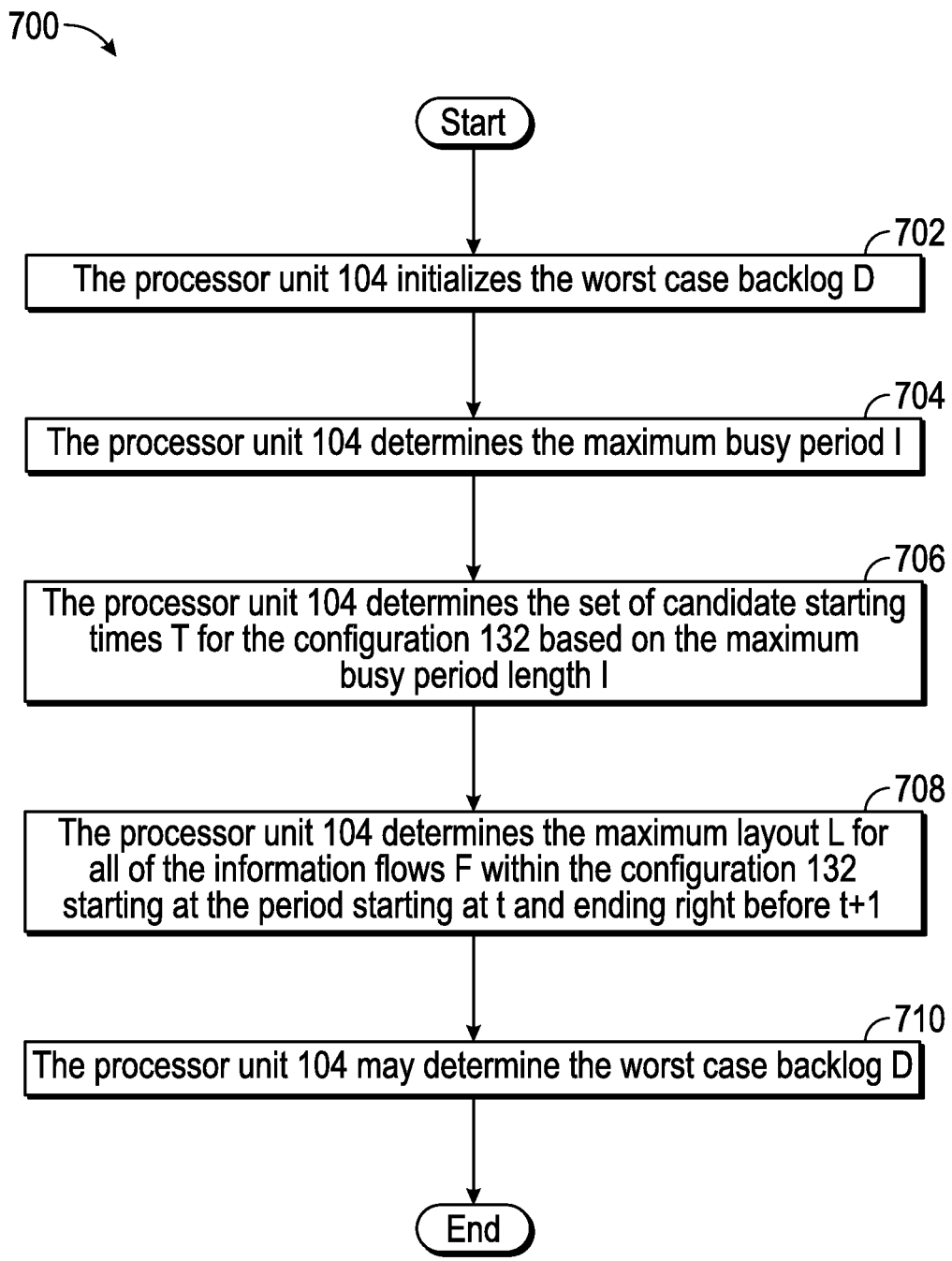
FIG. 10 is an exemplary process flow diagram illustrating a method for determining a worst case backlog of all queues in the configuration shown in FIG. 2.

Turning now to FIG. 10, an exemplary process flow diagram illustrating a method 700 for determining the worst case backlog D of all queues q in the configuration 132 (FIG. 2) is shown. Referring generally to FIGS. 1-4B and 10, method 700 may begin at block 702, where the processing unit 104 initializes the worst case backlog D to zeros. The worst case backlog D is expressed as a set of integers such that when initialized, the worst case backlog D may be expressed as [0, 0, . . . 0]. Method 700 may then proceed to block 704.

In block 704, the processor unit 104 may determine the maximum busy period length l, which is described above and illustrated FIG. 6 as method 300. Method 700 may then proceed to block 706.

In block 706, the processor unit 104 may determine the set of candidate starting times for the configuration 132 based on the maximum busy period length l determined in block 704. The method of determining the set of candidate starting times is described in greater above, and a process flow diagram illustrating the method 400 for determining the set of candidate starting times is illustrated in FIG. 7. Once the set of candidate starting times is determined, method 700 may then proceed to block 708.

Figure 11:
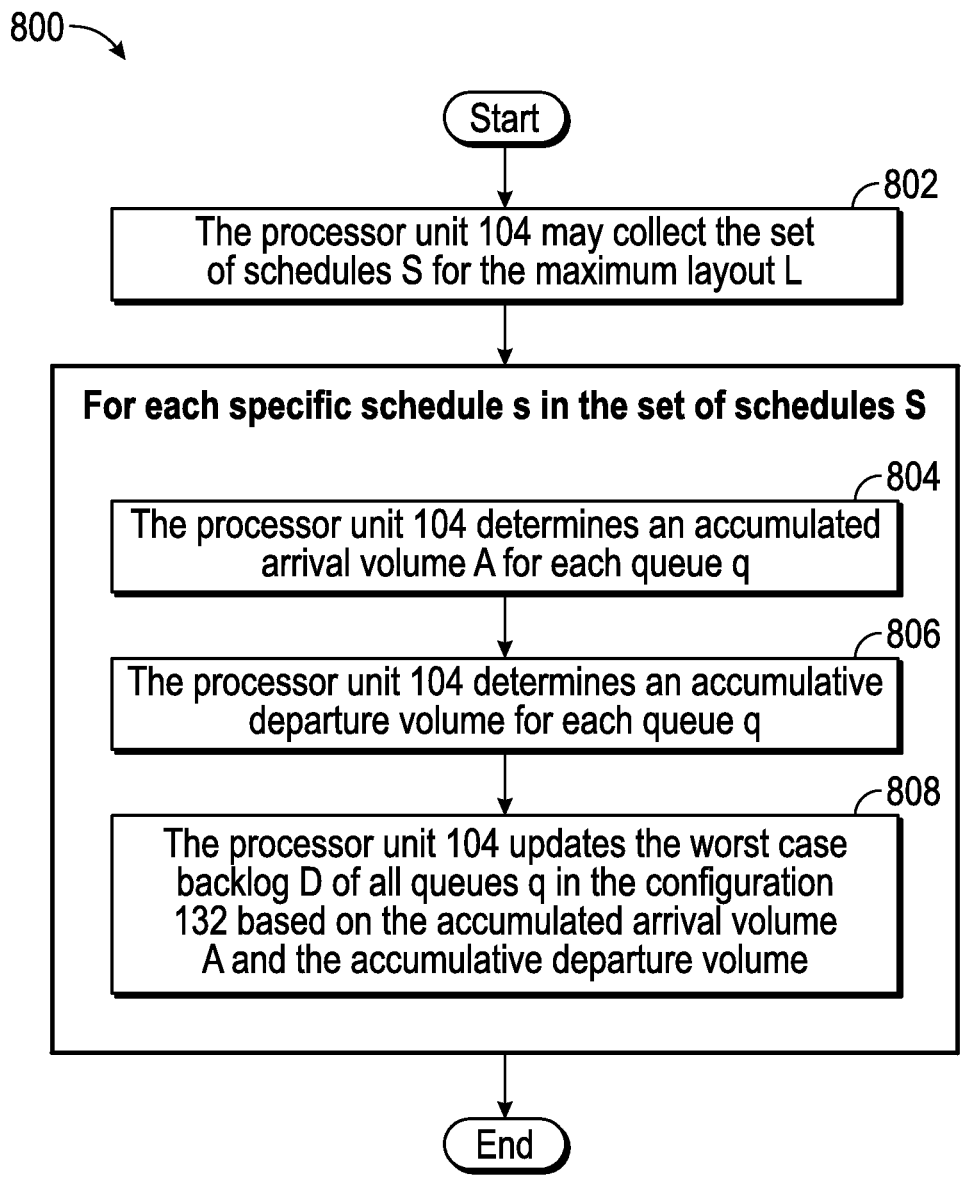
FIG. 11 is an exemplary process flow diagram illustrating a method for updating the worst case backlog with a maximum layout.

In block 708, the processor unit 104 may determine the maximum layout L for all of the information flows F within the configuration 132 starting at the period starting at time t and ending right before t+1, where l is the maximum busy period length. The processor unit 104 may then update the worst case backlog D with the maximum layout L. A method of updating the worst case backlog D with the maximum layout L is described in greater detail below and is illustrated in FIG. 11. Method 700 may proceed to block 710.

In block 710, the processor unit 104 may then report the worst case backlog D via the communications unit 110, the I/O unit 112, or the display 114 of the computing device 110 shown in FIG. 1. Method 700 may then terminate.

FIG. 11 is an exemplary process flow diagram illustrating a method 800 for updating the worst case backlog D with the maximum layout L as described in block 708 of method 700 shown in FIG. 10. Referring generally to FIGS. 1-4B and 11, method 800 may begin at block 802, where the processor unit 104 may collect the set of schedules S for the maximum layout L, which are generated by the scheduler 130 (FIG. 1). Method 800 may then proceed to block 804.

Figure 12:
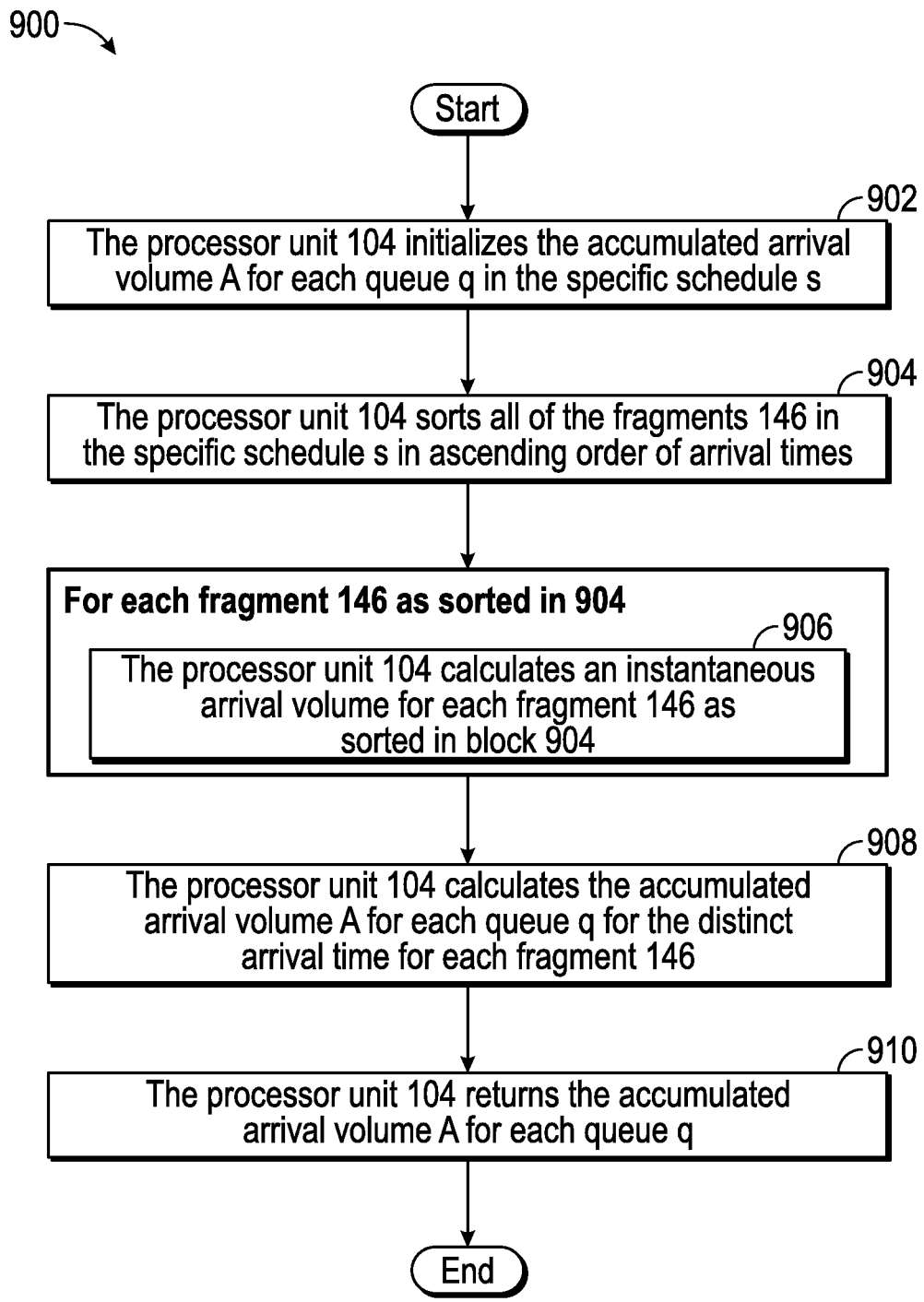
FIG. 12 is an exemplary process flow diagram illustrating a method for determining an accumulated arrival volume for each queue.

In block 804, the processor unit 104 may then determine an accumulated arrival volume A for each queue q for each distinct arrival time in a specific schedule s. The specific schedule s is part of the set of schedules S. A method 900 for determining the accumulated arrival volume A for each queue q is described in greater detail below, and is illustrated in FIG. 12. The accumulated arrival volume A for a specific queue q is a piecewise linear curve of data units over a period of time. For example, if an exemplary schedule included only two fragments, where the first fragment arrived at a time $t_1$ with a volume $v_1$, and the second fragment arrived at a time $t_2$ with a volume $v_2$, then the accumulated arrival volume A includes three line segments. The first line segment is before time $t_1$ and has a volume of zero, the second line segment is between $t_1$ and $t_2$ and includes volume $v_1$, and the third line segment includes a volume equal to $v_1+v_2$ and is located after time $t_2$. Method 800 may then proceed to block 806.

Figure 13:
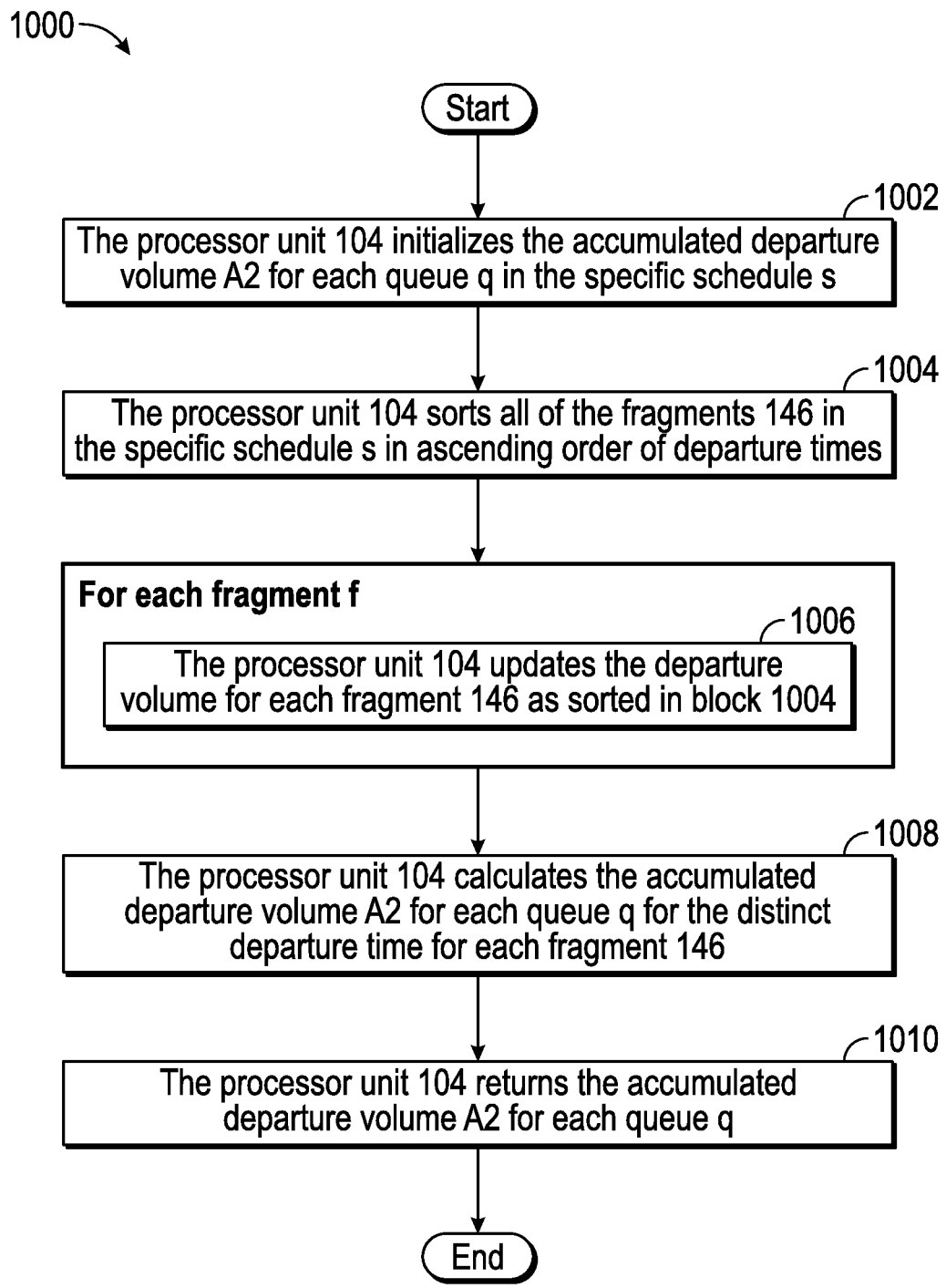
FIG. 13 is an exemplary process flow diagram illustrating a method for determining an accumulated departure volume for each queue.

In block 806, the processor unit 104 may determine an accumulative departure volume A2 for each queue q for each distinct departure time in the specific schedule s. A method 1000 for determining the accumulative departure volume A2 for each queue q is described in greater detail below, and is illustrated in FIG. 13. Method 800 may then proceed to block 808.

Figure 14:
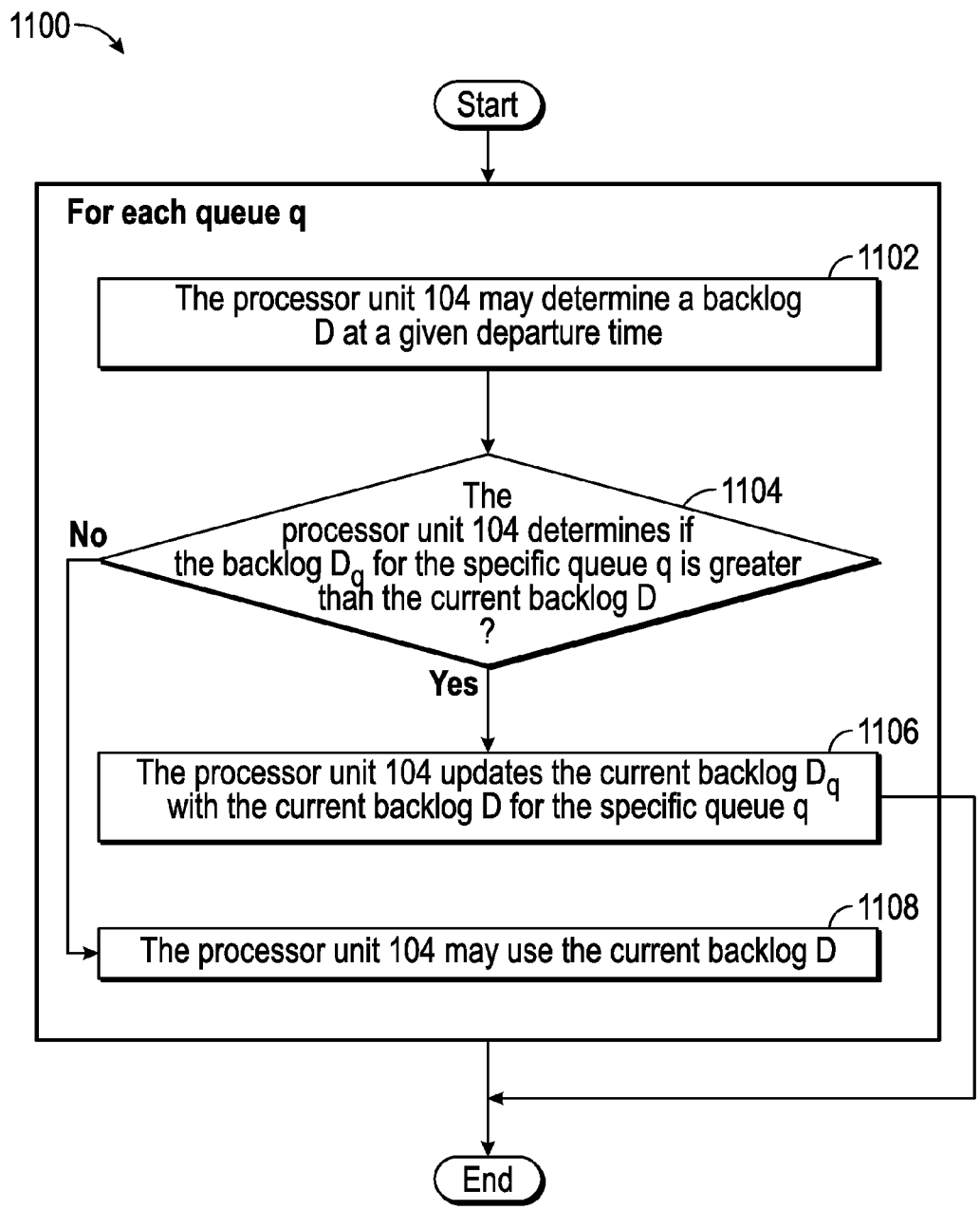
FIG. 14 is an exemplary process flow diagram illustrating a method for updating the worst case backlog of all queues in the configuration based on the accumulated arrival volume and the accumulative departure volume.

In block 808, the processor unit 104 may update the worst case backlog D of all queues q in the configuration 132 (FIG. 2) based on the accumulated arrival volume A and the accumulative departure volume A2 for each queue q at each unique departure time t for all fragments 146 in the specific schedule s. A method 1100 for determining the worst case backlog D of all queues q in the configuration 132 is described in greater detail below, and is illustrated in FIG. 14. Method 800 may then terminate.

FIG. 12 is an exemplary process flow diagram illustrating the method 900 for determining the accumulated arrival volume A for each queue q as described in block 804 of method 800 shown in FIG. 11. Referring generally to FIGS. 1-4B and 12, method 900 may begin at block 902, where the processor unit 104 initializes the accumulated arrival volume A for each queue q in the specific schedule s to zero data units over time. Method 900 may then proceed to block 904.

In block 904, the processor unit 104 may then sort all of the fragments 146 in the specific schedule s in ascending order of arrival times. Method 900 may then proceed to block 906.

In block 906, the processor unit 104 may update the arrival volume for each fragment 146 as sorted in block 904. More specifically, the processor unit 104 may calculate an instantaneous arrival volume by adding the fragment volume v at arrival time t for each fragment 146 (shown in FIG. 3). Once all of the arrival volumes for each fragment 146 as sorted in block 904 are updated, method 900 may proceed to block 908.

In block 908, the processor unit 104 may calculate the accumulated arrival volume A for each queue q by adding the instantaneous arrival volume determined in block 906 and a previously determined accumulated arrival volume together for each distinct arrival time in an ascending order of the arrival times. Method 900 may then proceed to block 910.

In block 910, the processor unit 104 may return the accumulated arrival volume A for each queue q. Method 900 may then terminate.

Turning now to FIG. 13, the method 1000 for determining the accumulative departure volume A2 for each queue q as described in block 804 of method 800 is illustrated. Referring generally to FIGS. 1-4B and 13, method 1000 may begin at block 1002, where the processor unit 104 initializes the accumulative departure volume A2 for each queue q in the specific schedule s to zero data units over time. Method 900 may then proceed to block 1004.

In block 1004, the processor unit 104 may then sort all of the fragments 146 in the specific schedule s in ascending order of departure times. Method 1000 may then proceed to block 1006.

In block 1006, the processor unit 104 may update the departure volume for each fragment 146 as sorted in block 1004. More specifically, the processor unit 104 may calculate the instantaneous departure volume by adding the fragment volume v at departure time t for each fragment 146 (shown in FIG. 3). Once all of the departure volumes for each fragment 146 as sorted in block 1004 are updated, method 1000 may proceed to block 1008.

In block 1008, the processor unit 104 may calculate the accumulated departure volume A2 for each queue q by adding the instantaneous arrival volume and the previously determined accumulated arrival volume for each distinct departure time in ascending order of the departure times. Method 1000 may then proceed to block 1010.

In block 1010, the processor unit 104 may return the accumulated departure volume A2 for each queue q. Method 1000 may then terminate.

FIG. 14 is an exemplary process flow diagram illustrating the method 1100 for updating the worst case backlog D of all queues q at a given departure time in the configuration 132 (FIG. 2) based on the accumulated arrival volume A and the accumulative departure volume A2. Referring generally to FIGS. 1-4B and 14, method 1100 may begin at block 1102, where for each queue q, the processor unit 104 may determine a backlog D at the given departure time as the difference between the accumulated departure volume and the accumulated arrival volume at a given time for a specific queue q. Method 1100 may then proceed to block 1104.

In block 1104, the processor unit 104 determines if the backlog $D_q$ for the specific queue q is greater than the current backlog D. If the backlog $D_q$ for the specific queue q is greater than the current backlog D, then method 1100 may proceed to block 1106, where the processor unit 104 updates the backlog $D_q$ to be the current backlog D for the specific queue q. Method 1100 may then terminate.

If the backlog $D_q$ for the specific queue q is not greater than the current backlog D, method 110 may then proceed to block 1108, where the processor unit 104 may use the current backlog D. Method 1100 may then terminate.

Referring generally to the figures, it is to be appreciated that the disclosed method as described above and illustrated in FIGS. 10-14 determines the worst case backlog D for all queues in a harmonic, stable configuration for any work-conserving, isolable, consistent, and backlog monotone scheduler 130. It is to be understood that a scheduler for a given configuration may be considered backlog monotone if any pair of compliant layouts of a specific configuration, for which the scheduler generates a first schedule for a first layout and a second schedule for a second layout, meets three requirements. The first requirement is the first layout and the second layout are identical, except that the first layout includes an extra fragment, and that any fragment in the second schedule departs no later than the corresponding fragment in the first schedule. The second requirement is the first layout and the second layout are identical, except that the first layout may include a fragment having a larger volume than a corresponding fragment of the second layout, and that any fragment in the second schedule departs no later than the corresponding fragment in the first schedule. Finally, the third requirement is that the first layout and the second layout are identical, except that for a single pair of corresponding batches, the batch corresponding to the first layout arrives earlier than the batch corresponding to the second layout, and any fragment in the second schedule departs no later than the corresponding fragment in the first schedule.

Referring generally to the figures, the disclosed system may directly identify the worst case latency of a specific information flow and the worst case backlog of a queue of a configuration in the disclosed asynchronous deterministic network. The disclosed system explores a limited search space of all possible scenarios, and therefore may be performed relatively quickly for larger networks, which is beneficial. The worst case latency of the information flow and the worst case backlog of the queue as determined by the disclosed system is precise, which means that the messages may experience the exact latency and the queues include the exact backlog. In other words, no other latencies or backlogs that are worse than the worst case latency and the worst case backlog determined by the disclosed system may exist.

While the forms of apparatus and methods herein described constitute preferred aspects of this disclosure, it is to be understood that the disclosure is not limited to these precise forms of apparatus and methods, and the changes may be made therein without departing from the scope of the disclosure.

What is claimed is:

1. A system for determining a worst case latency for a specific information flow of a plurality of information flows, wherein the plurality of information flows are part of a configuration for an asynchronous deterministic network, the system comprising:

a processor in communication with a display; and a memory storing a scheduler and instructions executable by the processor to perform operations comprising:

determining a spare servicing capacity of the configuration by subtracting a maximum servicing capacity of the system by a sum of processing demands for all the plurality of information flows;

in response to determining no spare servicing capacity is available, setting an initial maximum busy period length as a maximum busy period length, wherein a busy period represents a time span during which the asynchronous deterministic network is busy processing incoming fragments without idling and the maximum busy period length represents a maximum length of all possible busy periods within a given period of time of the configuration;

in response to determining available spare servicing capacity, determining the maximum busy period length for the configuration by selecting one of the initial maximum busy period length and an alternate busy period, wherein the alternate busy period is determined based on the sum of the processing demands for all the plurality of information flows;

determining a set of candidate starting times for the configuration based on the maximum busy period length;

determining, based on the set of candidate starting times, a maximum layout for the plurality of information flows within the configuration except for the specific information flow;

updating the worst case latency based on the maximum layout;

determining the worst case latency for the specific information flow based on the updated worst case latency; and generating a graphic representing the worst case latency upon the display, wherein the worst case latency is used by a verification process of performance characteristics of the system.

2. The system of claim 1, wherein the set of candidate starting times begins at a start of a given period and includes a length equal to the maximum busy period length.

3. The system of claim 1, wherein each candidate starting time in the set of candidate starting times is located within a given period starting at a time of zero, and includes a length equal to the maximum busy period length.

4. The system of claim 3, wherein a minimum offset of the specific information flow is located no earlier than a beginning time of a single arrival window of the configuration, and wherein at most a single batch of fragments arrive within the single arrival window for the specific information flow.

5. The system of claim 1, wherein updating the worst case latency includes making a copy of a layout of the configuration, and wherein the copy of the layout is a working layout.

6. The system of claim 5, wherein updating the worst case latency includes adding a number of batches to the working layout, and wherein the number of batches is a total number of batches within the specific information flow.

7. The system of claim 6, wherein updating the worst case latency includes determining a second worst case latency, and wherein the worst case latency is based on a set of schedules generated by the scheduler.

8. The system of claim 1, wherein the specific information flow includes at least one message, and the at least one message includes at least one fragment, and wherein the at least one message is added to the configuration as a batch of fragments.

9. A system for determining a worst case backlog of a queue in a configuration for an asynchronous deterministic network, wherein the configuration includes a plurality of queues, the system comprising:
   a processor in communication with a display; and a memory storing a scheduler and instructions executable by the processor to perform operations comprising:
   determining a spare servicing capacity of the configuration by subtracting a maximum servicing capacity of the system by a sum of processing demands for all the plurality of information flows;
   in response to determining no spare servicing capacity is available, setting an initial maximum busy period length as a maximum busy period length, wherein a busy period represents a time span during which the asynchronous deterministic network is busy processing incoming fragments without idling and the maximum busy period length represents a maximum length of all possible busy periods within a given period of time of the configuration;
   in response to determining available spare servicing capacity, determining the maximum busy period length for the configuration by selecting one of the initial maximum busy period length and an alternate busy period, wherein the alternate busy period is determined based on the sum of processing demands for all the plurality of information flows;
   determining a set of candidate starting times for the configuration based on the maximum busy period length;

determining, based on the set of candidate starting times, a maximum layout for a plurality of information flows within the configuration;
updating the worst case backlog with the maximum layout;
determining the worst case backlog based on the updated worst case backlog; and
generating a graphic representing the worst case backlog upon the display, wherein the worst case backlog is used by a verification process of performance characteristics of the system.

10. The system of claim 9, wherein the set of candidate starting times begins at a start of a given period and includes a length equal to the maximum busy period length.

11. The system of claim 9, wherein each candidate starting time in the set of candidate starting times is located within a given period starting at a time of zero, and includes a length equal to the maximum busy period length.

12. The system of claim 11, wherein a minimum offset of a specific information flow is located no earlier than a beginning of a single arrival window of the configuration, and wherein at most a single batch of fragments arrive within the single arrival window for the specific information flow.

13. The system of claim 9, wherein updating the worst case backlog with the maximum layout includes determining an accumulated arrival volume and an accumulated departure volume for each queue in the configuration.

14. The system of claim 13, wherein the accumulated arrival volume is determined for each queue in the configuration at distinct arrival times in a specific schedule, and wherein the specific schedule is part of a set of schedules.

15. The system of claim 13, wherein the accumulated departure volume is determined for each queue in the configuration at distinct departure times in a specific schedule, and wherein the specific schedule is part of a set of schedules.

16. The system of claim 9, wherein the queues each include at least one information flow, and wherein each information flow is assigned to a single queue and includes a sequence of at least one message generated from a single source at a given rate.

17. A non-transitory computer readable medium for determining a worst case latency for a specific information flow that is part of a plurality of information flows of a configuration, the computer readable medium comprising a computer program that when executed by a computer, causes the computer to:
   determine a spare servicing capacity of the configuration by subtracting a maximum servicing capacity of the system by a sum of processing demands for all the plurality of information flows:
   in response to determining no spare servicing capacity is available, set an initial maximum busy period length as a maximum busy period length, wherein a busy period represents a time span during which a asynchronous deterministic network is busy processing incoming fragments without idling and the maximum busy period length represents a maximum length of all possible busy periods within a given period of time of the configuration in response to determining available spare servicing capacity,
   determine the maximum busy period length for the configuration by selecting one of the initial maximum busy period length and an alternate busy period, wherein the alternate busy period is determined based on the sum of processing demands for all the plurality of information flows;

determine a set of candidate starting times for the configuration based on the maximum busy period length;

determine, based on the set of candidate starting times, a maximum layout for a plurality of information flows within the configuration except for the specific information flow;

update the worst case latency based on the maximum layout;

determine the worst case latency for the specific information flow based on the updated worst case latency; and generate a graphic representing the worst case latency upon a display of the computer, wherein the worst case latency is used by a verification process of performance characteristics of the system.

18. The computer readable medium of claim 17, wherein the computer is further caused to determine a worst case backlog of a queue in the configuration, wherein the worst case backlog is determined based on the maximum busy period length for the configuration and the set of candidate starting times for the configuration.

* * * * *